(12) United States Patent
Pan et al.

(10) Patent No.: US 11,300,939 B2
(45) Date of Patent: Apr. 12, 2022

(54) MOTION CONTROL PROGRAM, MOTION CONTROL METHOD, AND MOTION CONTROL DEVICE

(71) Applicant: Soft Servo Systems, Inc., Tokyo (JP)

(72) Inventors: Ziyuan Pan, Tokyo (JP); Jsoon Kim, Tokyo (JP); Boo-Ho Yang, Tokyo (JP)

(73) Assignee: Soft Servo Systems, Inc., Tokyo (JP)

( * ) Notice: Subject to any disclaimer, the term of this patent is extended or adjusted under 35 U.S.C. 154(b) by 0 days.

(21) Appl. No.: 17/254,756

(22) PCT Filed: Jun. 22, 2018

(86) PCT No.: PCT/JP2018/023764
§ 371 (c)(1),
(2) Date: Dec. 21, 2020

(87) PCT Pub. No.: WO2019/244329
PCT Pub. Date: Dec. 26, 2019

(65) Prior Publication Data
US 2021/0116877 A1    Apr. 22, 2021

(51) Int. Cl.
*G06F 9/00* (2006.01)
*G05B 19/042* (2006.01)
(Continued)

(52) U.S. Cl.
CPC ......... *G05B 19/0421* (2013.01); *G05B 15/02* (2013.01); *G05B 19/40* (2013.01);
(Continued)

(58) Field of Classification Search
CPC ...................... G05B 19/40; G05B 2219/25346
(Continued)

(56) References Cited

U.S. PATENT DOCUMENTS 6,208,104 B1    3/2001  Onoue et al.
6,675,070 B2    1/2004  Lapham
(Continued)

FOREIGN PATENT DOCUMENTS

CN    1392979 A    1/2003
CN    1418332 A    5/2003
(Continued)

OTHER PUBLICATIONS

Ceroni et al., "Part 12 Robotics Terminology" Handbook of Industrial Robotics, Second Edition, 1999, pp. 1260-1317 (Year: 1999).*
(Continued)

*Primary Examiner* — Emilio J Saavedra
(74) *Attorney, Agent, or Firm* — Sterne, Kessler, Goldstein & Fox P.L.L.C.

(57) ABSTRACT

A motion control program that causes a computer to function as: a reception unit on a non-real-time OS that receives a control command that controls a plurality of control target devices, and notifies a control unit of control command information indicating a content of the received control command; the control unit that generates an interpolation command for each of the control target devices repeatedly for each of motion control cycles based on the control command information notified from the reception unit, and stores the generated interpolation command; and a communication module unit that obtains an interpolation command, converts the obtained interpolation command from a predetermined signal format which can be recognized by the control unit into a signal format with a communication interface standard which can be recognized by each of the plurality of control target devices, and transmits the interpolation command.

7 Claims, 15 Drawing Sheets

(51) Int. Cl.
*G05B 15/02* (2006.01)
*G05B 19/40* (2006.01)
*G05B 19/409* (2006.01)
*G05B 19/4155* (2006.01)
*G06F 9/54* (2006.01)

(52) U.S. Cl.
CPC ....... *G05B 19/409* (2013.01); *G05B 19/4155* (2013.01); *G06F 9/544* (2013.01); *G05B 2219/25346* (2013.01); *G05B 2219/33216* (2013.01)

(58) Field of Classification Search
USPC .......................................................... 700/5
See application file for complete search history.

(56) References Cited

U.S. PATENT DOCUMENTS

| | | | |
|---|---|---|---|
| 6,678,582 | B2 | 1/2004 | Waled |
| 8,050,797 | B2 | 11/2011 | Lapham |
| 8,473,202 | B2 | 6/2013 | Lapham |
| 8,761,932 | B2 | 6/2014 | Lapham |
| 10,857,672 | B2 | 12/2020 | Lee et al. |
| 10,864,635 | B2 | 12/2020 | Lee et al. |
| 2002/0087232 | A1 | 7/2002 | Lapham |
| 2003/0050734 | A1 | 3/2003 | Lapham |
| 2003/0095514 | A1 | 5/2003 | Sabe et al. |
| 2003/0225479 | A1 | 12/2003 | Waled |
| 2004/0153213 | A1 | 8/2004 | Lapham |
| 2005/0182497 | A1 | 8/2005 | Nakano |
| 2005/0267637 | A1 | 12/2005 | Lapham |
| 2006/0179120 | A1 | 8/2006 | Kegoya et al. |
| 2007/0168082 | A1 | 7/2007 | Kim et al. |
| 2010/0161913 | A1 | 6/2010 | Ishibashi |
| 2012/0016521 | A1 | 1/2012 | Lapham |
| 2013/0282148 | A1 | 10/2013 | Koyama et al. |
| 2013/0282176 | A1 | 10/2013 | Lapham |
| 2014/0074291 | A1 | 3/2014 | Emoto et al. |
| 2017/0168082 | A1 | 6/2017 | Johnson et al. |
| 2017/0203436 | A1 | 7/2017 | Wei et al. |
| 2017/0293502 | A1 | 10/2017 | Kanaya et al. |
| 2018/0081712 | A1 | 3/2018 | Kanai et al. |
| 2018/0101143 | A1 | 4/2018 | Rusakov |
| 2018/0183873 | A1* | 6/2018 | Wang ...................... H04L 67/02 |
| 2018/0229367 | A1 | 8/2018 | Lee et al. |
| 2018/0281187 | A1* | 10/2018 | Lee ........................ B25J 9/1656 |
| 2018/0281195 | A1* | 10/2018 | Lee .......................... B25J 9/161 |
| 2018/0352299 | A1 | 12/2018 | Wu et al. |

FOREIGN PATENT DOCUMENTS

| | | |
|---|---|---|
| CN | 1658600 A | 8/2005 |
| CN | 105159252 A | 12/2015 |
| CN | 108136577 A | 6/2018 |
| EP | 2687929 | 1/2014 |
| JP | H05-297910 A | 11/1993 |
| JP | H10-309685 A | 11/1998 |
| JP | 2006-236243 A | 9/2006 |
| JP | 2006-350768 A | 12/2006 |
| JP | 2007-086921 A | 4/2007 |
| JP | 2010-146410 A | 7/2010 |
| JP | 2010-170435 A | 8/2010 |
| JP | 2012-003672 A | 1/2012 |
| JP | 2012-048617 A | 3/2012 |
| JP | 2015-156182 A | 8/2015 |
| JP | 2015-176319 A | 10/2015 |
| JP | 2016-112645 A | 6/2016 |
| JP | 2017-079043 A | 4/2017 |
| JP | 2017-204072 A | 11/2017 |
| KR | 2017-0035766 | 3/2017 |

OTHER PUBLICATIONS

International Search Report and Written Opinion of the International Searching Authority directed to related International Patent Application No. PCT/JP2018/023764, dated Sep. 4, 2018, with attached English-language translation; 14 pages.

International Preliminary Report on Patentability directed to related International Patent Application No. PCT/JP2018/023764, dated Dec. 22, 2020, with attached English-language translation; 10 pages.

Wu, J. et al., "The Design and Experimental Research of an Open Architecture Soft-CNC System Based on RTX and an IPC", *Int J Adv ManufTechnol*, vol. 89, pp. 1387-1399, Jul. 26, 2016.

* cited by examiner

FIG. 7

(a) DEVICE MANAGEMENT INFORMATION (CONTROL INSTRUCTION UNIT (1))

| DEVICE IDENTIFIER | API CHANNEL IDENTIFIER |
|---|---|
| D1 | API CHANNEL 1 |

(b) DEVICE MANAGEMENT INFORMATION (IF (R SIDE) UNIT)

| DEVICE IDENTIFIER | API CHANNEL IDENTIFIER |
|---|---|
| D1 | API CHANNEL 1 |

(c) STATE CHANNEL MANAGEMENT INFORMATION (IF (R SIDE) UNIT)

| STATE CHANNEL IDENTIFIER | MODULE IDENTIFIER |
|---|---|
| STATE CHANNEL A | CONTROL COMMAND MODULE A |

(d) ADDRESS MANAGEMENT INFORMATION (IF (N SIDE) UNIT OF CONTROL INSTRUCTION UNIT (1))

| CHANNEL IDENTIFIER | ADDRESS RANGE OF SHARED MEMORY |
|---|---|
| OPERATION CHANNEL | xxx~xxx |
| API CHANNEL 1 | xxx~xxx |
| STATE CHANNEL A | xxx~xxx |

(e) ADDRESS MANAGEMENT INFORMATION (IF (R SIDE) UNIT)

| CHANNEL IDENTIFIER | ADDRESS RANGE OF SHARED MEMORY |
|---|---|
| OPERATION CHANNEL | xxx~xxx |
| API CHANNEL 1 | xxx~xxx |
| STATE CHANNEL A | xxx~xxx |

FIG. 9

(a) DEVICE MANAGEMENT INFORMATION (CONTROL INSTRUCTION UNIT (2))

| DEVICE IDENTIFIER | API CHANNEL IDENTIFIER |
|---|---|
| D2 | API CHANNEL 2 |

(b) DEVICE MANAGEMENT INFORMATION (IF (R SIDE) UNIT)

| DEVICE IDENTIFIER | API CHANNEL IDENTIFIER |
|---|---|
| D1 | API CHANNEL 1 |
| D2 | API CHANNEL 2 |

(c) STATE CHANNEL MANAGEMENT INFORMATION (IF (R SIDE) UNIT)

| STATE CHANNEL IDENTIFIER | MODULE IDENTIFIER |
|---|---|
| STATE CHANNEL A | CONTROL COMMAND MODULE A |
| STATE CHANNEL B | CONTROL COMMAND MODULE B |
| STATE CHANNEL C | CONTROL COMMAND MODULE C |

(d) ADDRESS MANAGEMENT INFORMATION (IF (N SIDE) UNIT OF CONTROL INSTRUCTION UNIT (2))

| CHANNEL IDENTIFIER | ADDRESS RANGE OF SHARED MEMORY |
|---|---|
| CHANNEL IDENTIFIER | |
| API CHANNEL 2 | xxx~xxx |
| STATE CHANNEL A | xxx~xxx |
| STATE CHANNEL B | xxx~xxx |
| STATE CHANNEL C | xxx~xxx |

(e) ADDRESS MANAGEMENT INFORMATION (IF (R SIDE) UNIT)

| CHANNEL IDENTIFIER | ADDRESS RANGE OF SHARED MEMORY |
|---|---|
| CHANNEL IDENTIFIER | |
| API CHANNEL 1 | xxx~xxx |
| STATE CHANNEL A | xxx~xxx |
| API CHANNEL 2 | xxx~xxx |
| STATE CHANNEL B | xxx~xxx |
| STATE CHANNEL C | xxx~xxx |

FIG.14

MAPPING INFORMATION

| AXIS | COMMUNICATION MODULE | SLAVE NUMBER |
|---|---|---|
| AXIS 1 | COMMUNICATION MODULE (EtherCAT) | 1 |
| AXIS 2 | COMMUNICATION MODULE (EtherCAT) | 2 |
| AXIS 3 | COMMUNICATION MODULE (RTEX) | 1 |
| ... | ... | ... |

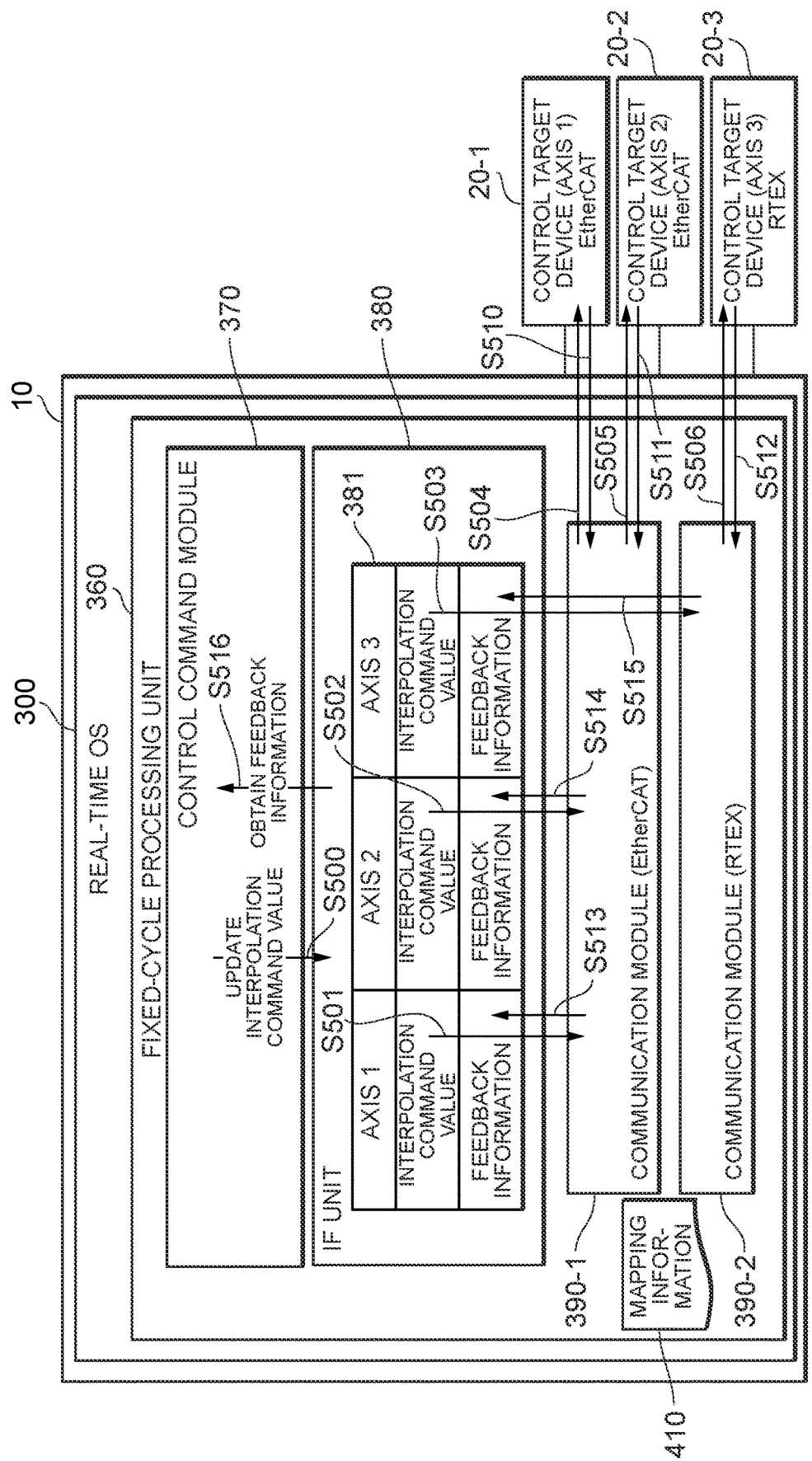

MOTION CONTROL PROGRAM, MOTION CONTROL METHOD, AND MOTION CONTROL DEVICE

TECHNICAL FIELD

The present invention relates to a motion control program, a motion control method, and motion control device.

BACKGROUND ART

In the fields of robot, factory automation (FA), and the like, it is required to perform operation as intended with respect to the position of a belt conveyer, the position of an arm, or the like. In order to perform such an operation, it is necessary to control a plurality of control target devices such as a servo motor and a stepping motor in accurate synchronization. A device that controls a plurality of control target devices in accurate synchronization as described above is referred to as a motion controller, a motion control device, or the like. For example, in Patent Literature 1, a motion control command system which can perform a smooth control while using an inexpensive and simple low-speed communication is disclosed.

CITATION LIST

Patent Literature

Patent Literature 1: Japanese Patent Laid-Open No. 2010-170435

SUMMARY OF INVENTION

Technical Problem

In general, a motion controller is required to have a highly accurate real-time performance and therefore, is provided as a dedicated hardware specializing in motion control. By being provided as a dedicated hardware, it can secure a required real-time performance; however, has a demerit of lack of versatility due to its high price and configuration that depends on a control target device and its communication protocol.

On the other hand, a personal computer that is a versatile information processing device has a merit of being inexpensive in comparison with the motion controller that is a dedicated hardware. In addition, it also has a merit of being able to provide a user interface of a design familiar to a user.

Here, at present, a real-time operating system (OS) is provided which can be installed on a personal computer on which a non-real-time OS (for example, Windows (registered trademark)) widely used as an OS of a personal computer has been installed. Therefore, it can be considered that if a personal computer on which both a non-real-time OS and a real-time OS have been installed can be used as a motion controller, various merits can be obtained. In addition, it can be considered that if, on one personal computer, a plurality of programs directing various motion operations, which are for example created by a user, can be executed and a plurality of control target devices can be controlled in parallel, further cost reduction can be achieved.

However, at present, there is not known a technique that allows a plurality of programs directing various motion operations to be installed and allows a plurality of control target devices to be controlled in parallel by using a personal computer on which both a non-real-time OS and a real-time OS have been installed.

Therefore, it is an object of the present invention to provide a technique that allows a plurality of programs directing various motion operations to be performed in performing motion control by using a computer on which a non-real-time OS and a real-time OS have been installed.

Solution to Problem

A motion control program according to one aspect of the present invention is a motion control program that is executed by a computer on which a non-real-time OS and a real-time OS have been installed and which performs motion control of a control target device; and causes the computer to function as: a plurality of reception units operating on the non-real-time OS, each of which is associated with each of a plurality of user-created programs controlling the control target device; a channel management unit operating on the real-time OS; and a fixed cycle processing unit operating on the real-time OS. The channel management unit creates an operation channel common to the plurality of reception units on a shared memory referable from the non-real-time OS and the real-time OS. Each of the reception units instructs via the operation channel, when receiving a preparation instruction to perform preparation for starting motion control of the control target device from a user-created program associated with the reception unit, a generation unit to generate a control command channel. The channel management unit creates on the shared memory, when instructed from the reception unit, a control command channel associated with the user-created program that has provided the preparation instruction. The reception unit receives from the user-created program a control command indicating an operation that should be performed by the control target device over a plurality of motion control cycles; and stores control command information indicating a content of the received control command, in the control command channel. The fixed-cycle processing unit transmits, to the control target device for each of the motion control cycles, an interpolation command indicating an operation which should be executed for each of the motion control cycles, based on the control command information obtained from the control command channel, thereby performing motion control of the control target device.

Advantageous Effects of Invention

According to the present invention, a technique can be provided that allows a plurality of applications directing various motion operations to be executed in performing motion control by using a computer on which a non-real-time OS and a real-time OS have been installed.

BRIEF DESCRIPTION OF DRAWINGS

FIG. 7 is an illustration for describing one example of various kinds of management information which is generated in performing the device creation processing.

FIG. 9 is an illustration for describing one example of various kinds of management information which is generated in performing the device creation processing.

FIG. 14 is an illustration that shows one example of mapping information.

FIG. 15 is an illustration for describing one example of a processing procedure of protocol conversion processing.

DESCRIPTION OF EMBODIMENTS

Figure 1:
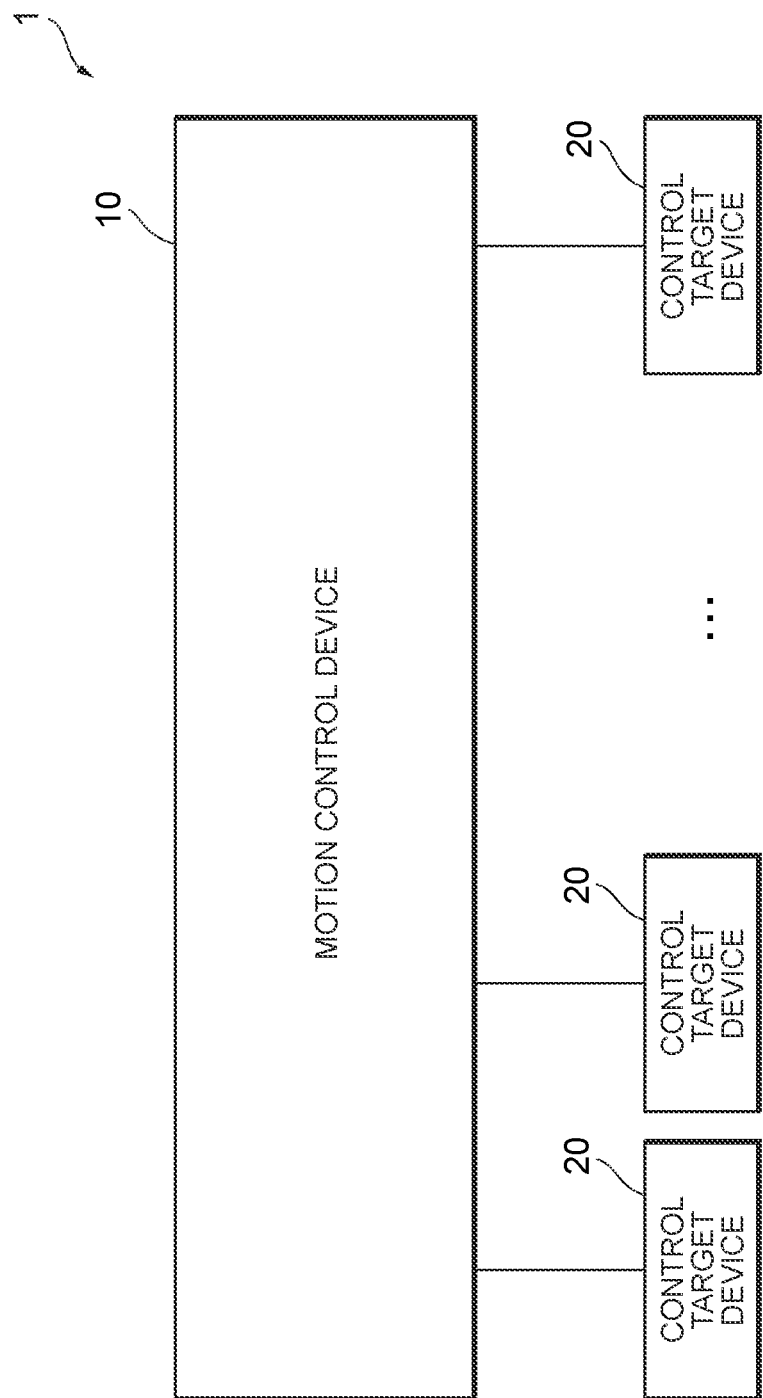
FIG. 1 is an illustration showing a system configuration example of a motion control system according to an embodiment.

A preferred embodiment of the present invention will be described with reference to the attached drawings. It should be noted that in the drawings, components denoted by the same reference sign have a same or similar configuration.
System Configuration FIG. 1 is an illustration that shows a system configuration example of a motion control system according to the embodiment. A motion control system 1 includes a motion control device 10 and a plurality of control target devices 20. It should be noted that the motion control system 1 does not necessarily need to include a plurality of control target devices 20 and may be configured so as to include only one control target device 20.

The control target devices 20 are, specifically, motors such as a servo motor (including a servo driver) and a stepper motor. The motion control device 10 controls the plurality of control target devices 20 while synchronizing them, thereby performing a rotation control of a belt conveyer, an axial control of a multi-axis robot, and a positioning control of a rotation table. Each one of the control target devices 20 controls one "axis." For example, a six-axis robot refers to a robot that is provided with six units of the control target device 20 that is a motor.

As a communication interface standard for providing a control command to the control target devices 20, for example, EtherCAT (registered trademark), RTEX (registered trademark), (Realtime Express (registered trademark)), MECHATROLINK (registered trademark), and the like are known. To the motion control device 10, the control target devices 20 of different communication interface standards can be coexistently connected.

The motion control device 10 is a versatile information processing device on which a non-real-time OS and a real-time OS have been installed. A specific example of the non-real-time OS is Windows (registered trademark), a Mac OS (registered trademark), or the like, for example. In addition, the real-time OS is, for example, a Real Time Extension (RTX), Real Time Hypervisor (RTH), or the like. Furthermore, a specific example of a versatile information processing device is, for example, a personal computer (PC), a notebook PC, a server, and the like.

Here, a conventional motion controller which is used for controlling the servo motor and stepper motor is generally provided as dedicated hardware that specializes in motion control so as to ensure highly accurate real-time performance. In addition, a program that provides a Graphical User Interface (GUI) by which a user programs contents of motion control is generally provided by a personal computer which is connected to the motion controller.

Figure 2:
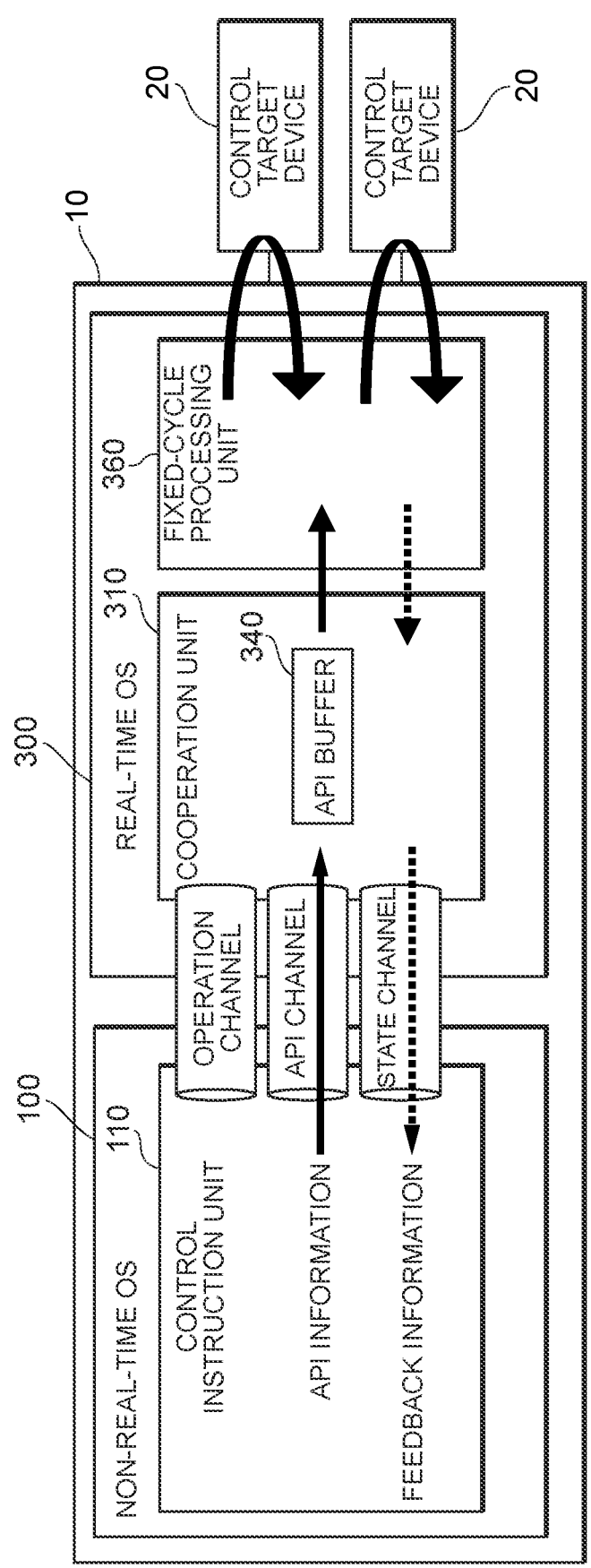
FIG. 2 is an illustration for describing an overview of a motion control device.

On the other hand, the motion control device 10 according to the present embodiment provides a GUI by which a user programs contents of motion control, on the non-real-time OS; and performs processing for actually controlling the control target devices 20 on the real-time OS, based on the programmed contents. Thus, a highly accurate motion control similar to the one in the case of using a motion controller of a dedicated hardware is realized only by a versatile information processing device.
Overview of Motion Control Device FIG. 2 is an illustration for describing the overview of the motion control device 10. A control instruction unit 110 operates on the non-real-time OS 100; and issues one or a plurality of control commands each indicating an operation that should be performed by each of the control target devices 20 over a plurality of motion control cycles, thereby controlling the control target device 20. The control instruction unit 110 includes a program which is created by a user who uses the motion control system 1; and in the program, control commands issued to the control target device 20, the order and timing for issuing the control commands, and the like are written by using a predetermined programming language. A specific example of the user-created program is a program for controlling a belt conveyer, an arm, and the like for achieving FA, a program for performing robot operation, or the like. On the non-real-time OS 100, it is possible to operate a plurality of the control instruction units 110.

The control commands each includes an identifier (ID or the like) and command value of the control command. A specific example of the control command is a Point to Point (PTP) operation (operation for movement to a specified point), a JOG operation (motor operation at a specified speed), a PTP operation by linear interpolation, a PTP operation by circular interpolation, JOG operation specifying an acceleration time, a JOG operation specifying an action time, or the like, for example. An identifier of a control command is information for specifically specifying a content of the control command (for example, an identifier indicating a PTP operation by circular interpolation, or the like). The command value is a parameter that specifically indicates an operation target and in the case of the PTP operation by circular interpolation, for example, it is a value indicating a movement destination point, a movement speed, a rotation radius, or the like. A control command issued by the control instruction unit 110 is notified to a cooperation unit 310 by using a channel described later.

Issuance of a control command by the control instruction unit 110 is performed by calling an Application Programming Interface (API) function in a program created by a user. In addition, specification of a command value is made by setting a value to an argument of the API function. The API function is provided one for each control instruction; for example, for the PTP operation, an API function of "startpos( )" is provided. In the present embodiment, information indicating an API function which is called by the control instruction unit 110 and an argument which is set in the API function is referred to as "API information." It should be noted that in the present embodiment, the API information may be referred to as "control command information."

The cooperation unit 310 includes a FIFO queue (hereinafter, referred to as an "API buffer") for temporarily storing API information which is notified from the control instruction unit 110. The cooperation unit 310 temporarily stores in the API buffer 340 a plurality of pieces of API information received from the control instruction unit 110. In addition, the cooperation unit 310 retrieves API information one by one from the API buffer 340 and passes it to a fixed-cycle processing unit 360. That is, the cooperation unit 310 performs exchange of API information with the fixed-cycle processing unit 360 by using the queue.

The fixed-cycle processing unit 360 operates on the real-time OS 300 and calculates an interpolation command indicating an operation that should be executed by the control target device 20 for each motion control cycle, based on the control command notified from the cooperation unit 310. In addition, the fixed-cycle processing unit 360 transmits the calculated interpolation command to the control target device 20 according to the motion control cycle, thereby, causing motion control of the control target device 20 to be performed. One motion control cycle is a unit of, for example, 0.5 ms or 1 ms. The control target device 20 operates according to an interpolation command notified for each motion control cycle and thereby, finally achieves an operation target which is indicated by a control command.

In addition, the fixed-cycle processing unit 360 performs protocol conversion between a signal format which can be recognized by the fixed-cycle processing unit 360 (hereinafter, referred to as a "common signal format") and a signal format compliant with a communication interface standard which can be recognized by the control target device 20. It should be noted that the common signal format is one example of "a predetermined signal format."

The control instruction unit 110 and the cooperation unit 310 exchange various kinds of information via a memory area (hereinafter, referred to as a "channel") which can be written and read in common by the control instruction unit 110 and the cooperation unit 310. In the channel, an operation channel, an API channel, and a state channel exist.

The "operation channel" is a channel used for the control instruction unit 110 and the cooperation unit 310 to transmit and receive control information. The operation channel is a channel that is used in common by all of the control instruction units 110 and while one or more control instruction units 110 are operating, one operation channel exists in the motion control device 10. In the present embodiment, the operation channel may be referred to as a "channel for operation."

The "API channel" is a channel used for transmitting API information from the control instruction unit 110 to the cooperation unit 310. At least one API channel exists for each of the control instruction units 110. In the present embodiment, the API channel may be referred to as a "control command channel."

The "state channel" is a channel for storing feedback information from the control target device 20. The state channel is a channel that is used in common by a plurality of the control instruction units 110 and one or a plurality of the state channels exist within the motion control device 10. The feedback information is information indicating the state (operation state) of each of the control target devices 20 and is measured by a sensor included within the control target device 20, a sensor connected to the control target device 20, or the like. The feedback information includes various information pieces such as an axis position, an axis rotation speed, an arm position, a belt conveyer position, and the temperature of the control target device 20. The control instruction units 110 refer to the state channel, thereby being able to grasp the operation states of the control target devices 20.

In the present embodiment, the API channel, the state channel, and the like which are associated with one control instruction unit 110 are collectively referred to as a "device." As described later, an API channel is reserved, when a device creation request is provided from a control instruction unit 110, as a channel dedicated to that control instruction unit 110 on the memory. On the other hand, a state channel is reserved on the memory when a device creation request is provided from a control instruction unit 110 that uses that state channel first; and after reserved, it becomes available also from the other control instruction units 110.

Figure 3:
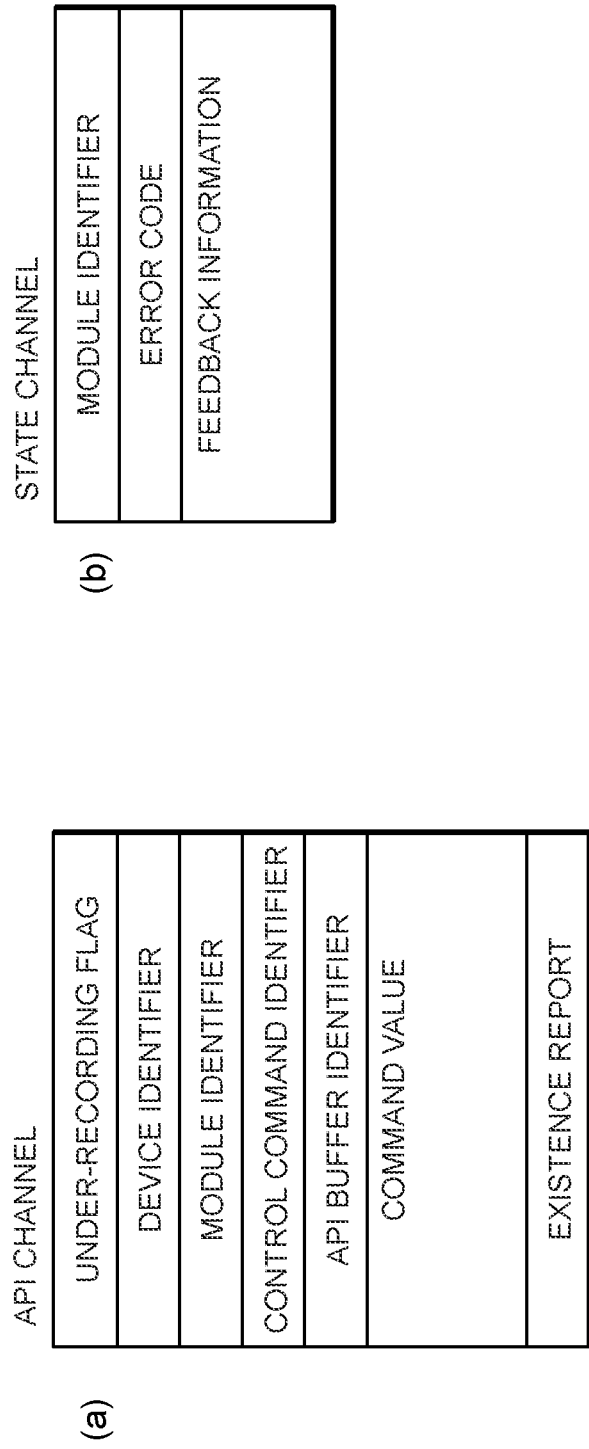
FIG. 3 is an illustration for describing one example for each of an API channel and a state channel.

Here, specific examples of the API channel and state channel are described. FIG. 3 is an illustration for describing one example for each of the API channel and the state channel. FIG. 3(a) shows examples of data that is stored in the API channel. In the "device identifier," a device identifier for uniquely identifying a generated device is stored. The "module identifier" will be described later. In the "control command identifier," information specifying the content of a control command (for example, positioning (PTP), JOG operation, linear interpolation, circular interpolation, or the like) is stored. The control command identifier may be an identifier that uniquely indicates the type of the control command or may be an identifier that uniquely indicates an API function.

In the "API buffer identifier," an API buffer identifier that uniquely specifies an API buffer 340 is stored. The "under-recording flag" will be described later. In the "command value," a command value of each axis is stored. For example, when the control command identifier is a PTP operation, a value indicating a movement destination position, and the like are stored in the command value of each axis. The "existence report" will be described later.

FIG. 3(b) shows examples of data that is stored in the state channel. The "module identifier" will be described later. In the "error code," when feedback information cannot be stored in the state channel due to the occurrence of any error, an error code indicating the content of the error that has occurred is stored. In the "feedback information," feedback information obtained from the control target devices 20 is stored for each of the control target devices 20 (for each axis).

Hardware Configuration

Figure 4:
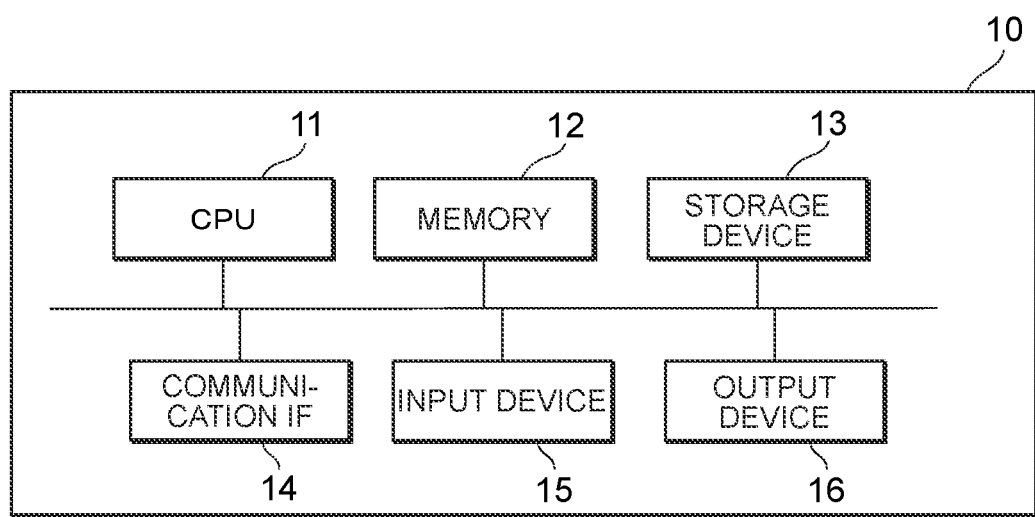
FIG. 4 is an illustration showing a hardware configuration example of the motion control device.

FIG. 4 is an illustration that shows a hardware configuration example of the motion control device 10. The motion control device 10 includes: a central processing unit (CPU) 11; a memory 12; a storage device 13 such as a harddisk (HDD) or a solid state drive (SSD); a communication interface (IF) 14 performing wired or wireless communication; an input device 15 receiving an input operation; and an output device 16 outputting information. The input device 15 is, for example, a keyboard, a touch panel, a mouse, and/or a microphone. The output device 16 is, for example, a display and/or a speaker.

Function Configuration

Figure 5:
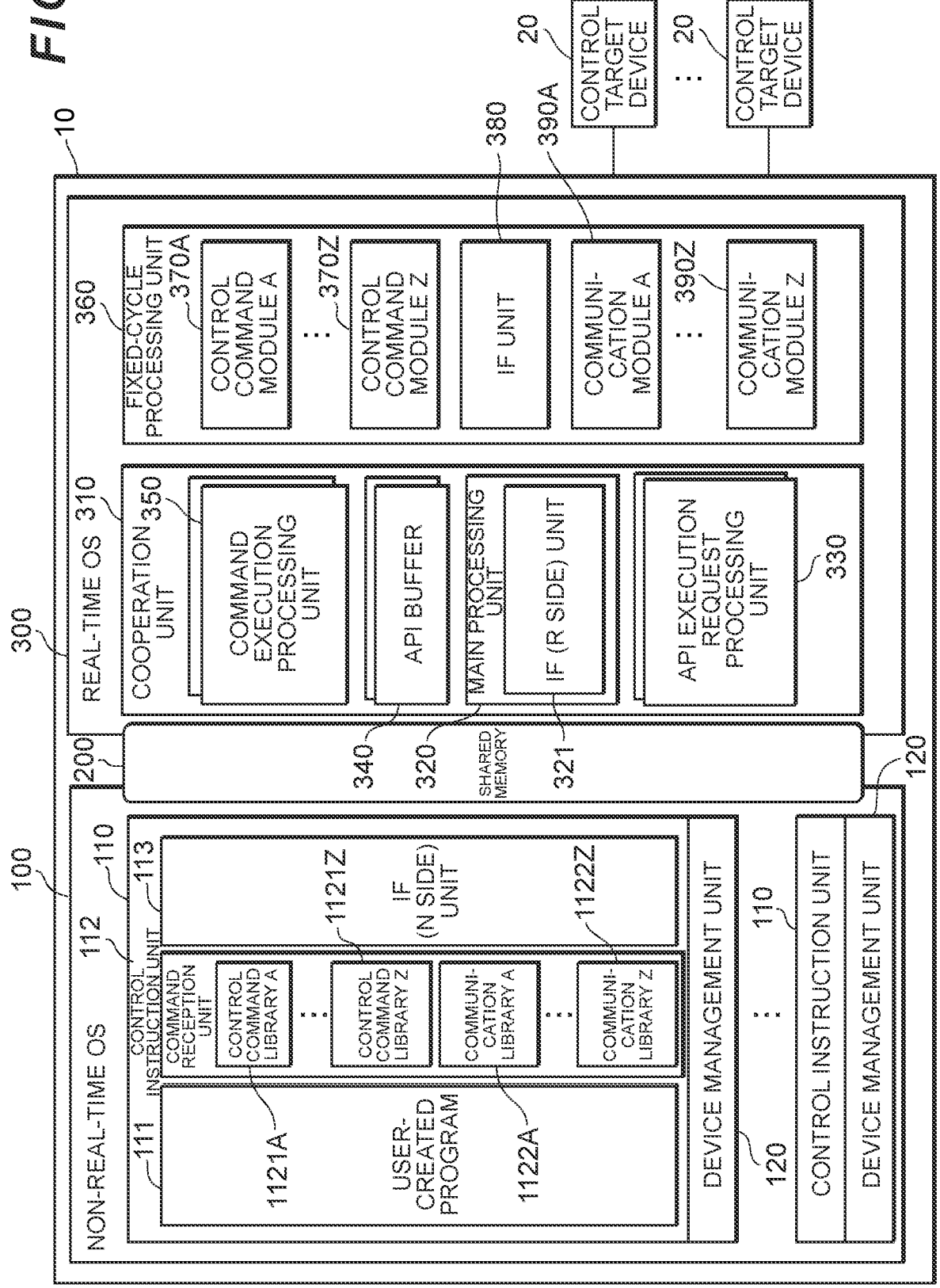
FIG. 5 is an illustration showing a functional configuration example of the motion control device.

FIG. 5 is an illustration that shows a function configuration example of the motion control device 10. A shared memory 200 is a memory that can be referred to and written in common from both function parts on a non-real-time OS 100 side and function parts on a real-time OS 300 side. In the shared memory 200, memory areas corresponding to the operation channel, the API channel, and the state channel are reserved. The control instruction unit 110 and the cooperation unit 310 write data in the memory areas and read out data from the memory areas, thereby performing transmission and reception of data.

Non-Real-Time OS

On the non-real-time OS 100, one or more control instruction units 110 and one or more device management units 120 operate.

The control instruction units 110 have a function of performing motion control of the control target devices 20 by issuing a control command. Each of the control instruction units 110 includes a user-created program 111, a command reception unit 112, and an IF (N side) unit 113.

The user-created program 111 is a program that is created by a user using the motion control device 10. The user calls various API functions provided on the non-real-time OS 100 side in the user-created program 111, thereby being able to create a program that enables a desired motion control. It should be noted that the user-created program 111 may be preset in the motion control device 10 in advance. That is, in the present embodiment, the user-created program 111 is not necessarily limited to a program that is created by a user.

The command reception unit 112 provides an API function to the user-created program 111. Specifically, the command reception unit 112 has a function of instructing the IF (N side) unit 113 to store, in the API channel, API information about an API function which is called by the user-created program 111.

It should be noted that the command reception unit 112 provides an API function that is included in a library which is actually referred to by the user-created program 111 in its program: out of control command libraries 1121A to 1121Z (hereinafter, when the control command libraries A to Z are not especially distinguished, they are simply referred to as a control command library 1121) and communication libraries 1122A to 1122Z (hereinafter, when the communication libraries A to Z are not especially distinguished, they are simply referred to as a communication library 1122).

Each of the control command libraries 1121A to 1121Z is a library that collectively includes load modules (execution files) of a plurality of API functions for performing processing to perform motion control of the control target devices 20. In addition, the communication libraries 1122A to 1122Z are libraries that collectively include load modules (execution files) of a plurality of API functions for performing processing related to communication which is performed by the motion control device 10 with the control target devices 20.

Here, processing related to the communication is: for example, processing of specifying, when a communication path which has been disconnected due to a broken wire, or the like is recovered, a timing for resuming communication from the user-created program 111; monitoring of a packet loss in a communication path between the motion control device 10 and the control target devices 20; and the like. When an API function provided by the communication library 1122 is called, API information is also notified to the fixed-cycle processing unit 360 via the cooperation unit 310, as with a case in which an API function provided by the control command library 1121 is called.

The IF (N side) unit 113 has: a function of storing data in the operation channel and the API channel; a function of obtaining data from the operation channel, the API channel, and the state channel; and a function of managing the operation channel, the API channel and the state channel.

It should be noted that the command reception unit 112 and the IF (N side) unit 113 serve to receive an API function called by the user-created program 111 and to store in the API channel and therefore, the command reception unit 112 and the IF (N side) unit 113 may be collectively referred to as a "reception unit."

The device management unit 120 check the existence/non-existence of the control instruction unit 110. In addition, the device management unit 120 performs various kinds of processing related to storage of API information in the API buffer 340. The device management unit 120 is started when the control instruction unit 110 creates a device. It should be noted that the device also includes the device management unit 120, more specifically, in addition to the API channel and the state channel.

Real-Time OS

On the real-time OS 300, the cooperation unit 310 and the fixed-cycle processing unit 360 operate.

The cooperation unit 310 is a function unit for making processing performed in the control instruction unit 110 and processing performed in the fixed-cycle processing unit 360 cooperate with each other; and has a function of transferring, to the fixed-cycle processing unit 360, API information which is received from the control instruction unit 110. The cooperation unit 310 includes the API buffer 340 serving as a FIFO queue; and stores in the API buffer 340 a control command (API information) which is transferred from the control instruction unit 110 via the API channel. In addition, the cooperation unit 310 retrieves the API information stored in the API buffer 340 and passes it to the fixed-cycle processing unit 360. Further, the cooperation unit 310 performs state management (generation, maintenance, and discarding) of the operation channel, the API channel, and the state channel.

The cooperation unit 310 includes, as function units executing the above functions, a main processing unit 320, an API execution request processing unit 330, an API buffer 340, and a command execution processing unit 350. In the main processing unit 320, an IF (R side) unit 321 is further included.

The main processing unit 320 has a function of generating an API buffer 340 in a memory area of the real-time OS when receiving a request from the control instruction unit 110. In the present embodiment, the main processing unit 320 may be referred to as a "queue generation unit."

The IF (R side) unit 321 performs various kinds of processing related to: creation of the operation channel, the API channel, and the state channel (memory area allocation in the shared memory 200); management of the allocated memory areas; and discarding of the API channel and the state channel (release of the shared memory 200). In the present embodiment, the IF (R side) unit 321 may be referred to as a "channel management unit." Alternatively, since the IF (R side) unit 321 is part of the cooperation unit 310, the cooperation unit 310 may be referred to as a "channel management unit."

Specifically, the IF (R side) unit 321 generates, when the IF (R side) unit 321 itself is started by an instruction of the real-time OS 300, an operation channel in the shared memory 200. In addition, the IF (R side) unit 321 generates an API channel when receiving a request from the control instruction unit 110 (more specifically, the IF (N side) unit 113). In addition, the IF (R side) unit 321 generates a state channel when receiving an instruction from the control instruction unit 110 (more specifically, IF (N side) unit 113).

The API execution request processing unit 330 obtains API information from the API channel and stores the obtained API information to the API buffer 340. In the present embodiment, the API execution request processing unit 330 may be referred to as a "storage unit." It should be noted that in the cooperation unit 310, one API execution request processing unit 330 for each above-described "device" operates. For example, when four control instruction units 110 each generates one device in the non-real-time OS 110, four API execution request processing units 330 corresponding to the devices operate in the cooperation unit 310. In the present embodiment, the "device" may also include the API execution request processing unit 330 in addition to the API channel, the state channel, and the device management unit 120.

The command execution processing unit 350 obtains API information which is stored in the API buffer 340; and passes the obtained API information to the control command module 370. In the present embodiment, the command execution processing unit 350 may be referred to as a "command processing unit." The command execution processing unit 350 does not operate in parallel in units of devices as with the API execution request processing unit 330 but command execution processing units 350 the number of which is specified in a setting file in advance operate in parallel in the cooperation unit 310.

The fixed-cycle processing unit 360 has a function of performing motion control of a control target device 20 by transmitting to the control target device 20 for each motion control cycle an interpolation command indicating an operation that should be executed for each motion control cycle, based on API information (control command information). In addition, the fixed-cycle processing unit 360 further includes, a control command module 370, an IF unit 380, and a communication module 390.

Control command modules 370A to 370Z (hereinafter, simply referred to as a control command module 370 when the control command modules A to Z are not especially distinguished) calculate an interpolation command based on the API information (control command information). In addition, the control command module 370 passes the calculated interpolation command to the IF unit 380. It should be noted that the control command module 370 may calculate an interpolation command based on both the API information and the state of the control target device 20 included in the feedback information of the control target device 20. In the present embodiment, the control command module 370 may be referred to as a "control unit."

In the present embodiment, API information (control command information) corresponding to an API function which is provided by the control command library 1121A is processed by the control command module 370A. Similarly, API information (control command information) corresponding to API functions which are provided by the control command libraries 1121B to 1121Z are processed by the control command module 370B to control command module 370Z, respectively. That is, the control command libraries 1121A to 1121Z are associated one to one with the control command modules 370A to 370Z, respectively. It should be noted that this is one example of an implementation method and it is not necessarily required to be in one-to-one association. For example, a plurality of control command libraries 1121 may be associated with one control command module 370. In the present embodiment, an identifier that uniquely identifies the control command module 370 is referred to as a "module identifier."

Specific examples of the control command module 370 include: a control command module 370 that executes, besides the PTP operation and JOG operation described above, a predetermined operation by using as a trigger a specific operation (for example, when a certain bit becomes 1) or the movement of a specific axis to a specified position; and a control command module 370 that obtains a specific value from a communication interface with the control target device 20. In addition, a control command module 370 that records the operation (position, speed, acceleration, and the like) of a specified control target device 20; a control command module 370 that corrects, for example, position errors due to the distortion or the like of a control target device 20; and the like are included. As a matter of course, the control command library 1121 that provides API functions corresponding to those functionalities is also provided on the non-real-time OS 110.

The IF unit 380 provides a memory area which can be referred in common by the control command module 370 and the communication module 390. The IF unit 380 is used to mutually exchange interpolation command values and feedback information between the control command module 370 and the communication module 390.

Each of the communication modules 390A to 390Z (hereinafter, simply referred to as a communication module 390 when the communication modules A to Z are not especially distinguished) is compliant with a different communication interface standard. In addition, in the present embodiment, API information that is notified to the fixed-cycle processing unit 360 by calling an API function provided by the communication library 1122A is processed by the communication module 390A. Similarly, each piece of API information that is notified to the fixed-cycle processing unit 360 by calling API functions provided by the communication libraries 1122B to 1122Z is processed by each of the communication modules 390B to 390Z. That is, the communication libraries 1122A to 1122Z are associated one to one with the communication modules 390A to 390Z, respectively. It should be noted that this is one example of an implementation method and it is not necessarily required to be in one-to-one association. For example, a plurality of communication libraries 114 may correspond to one communication module 390.

The control instruction unit 110, device management unit 120, cooperation unit 310, and fixed-cycle processing unit 360 which have been described above can be realized by execution of a program stored in the memory 12 or the storage device 13 by a CPU 11 of the motion control device 10 In addition, the program can be stored in a computer readable medium. The computer readable medium storing the program may be a non-transitory computer readable medium. The non-transitory computer readable medium is not particularly limited but it may be, for example, a computer readable medium such as a USB memory or a CD-ROM. It should be noted that the program may or need not include the user-created program 111.

Processing Procedure

Subsequently, a specific processing procedure performed by the motion control device 10 will be described.

Device Creation Processing

Figure 6:
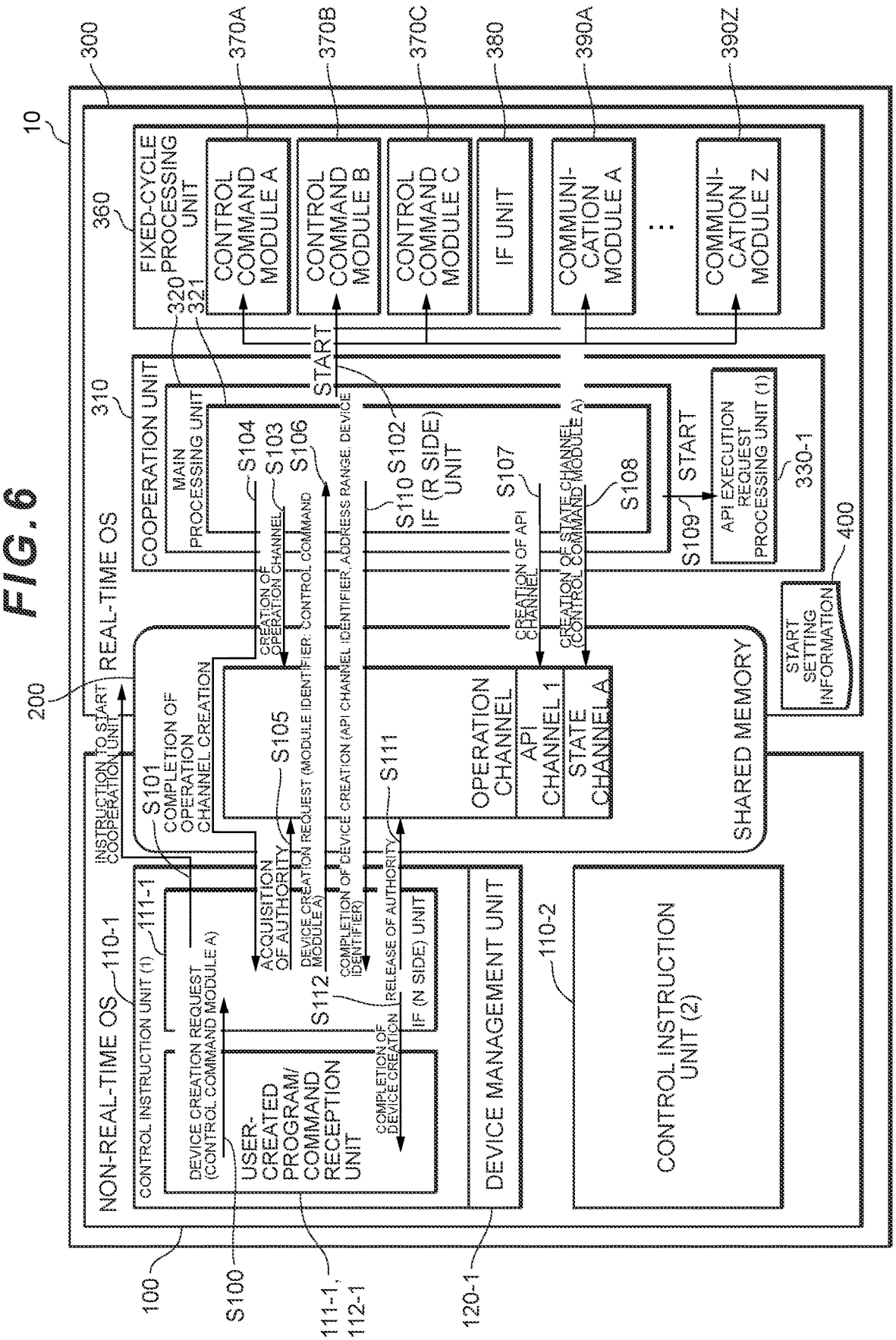
FIG. 6 is an illustration for describing one example of device creation processing.
Figure 8:
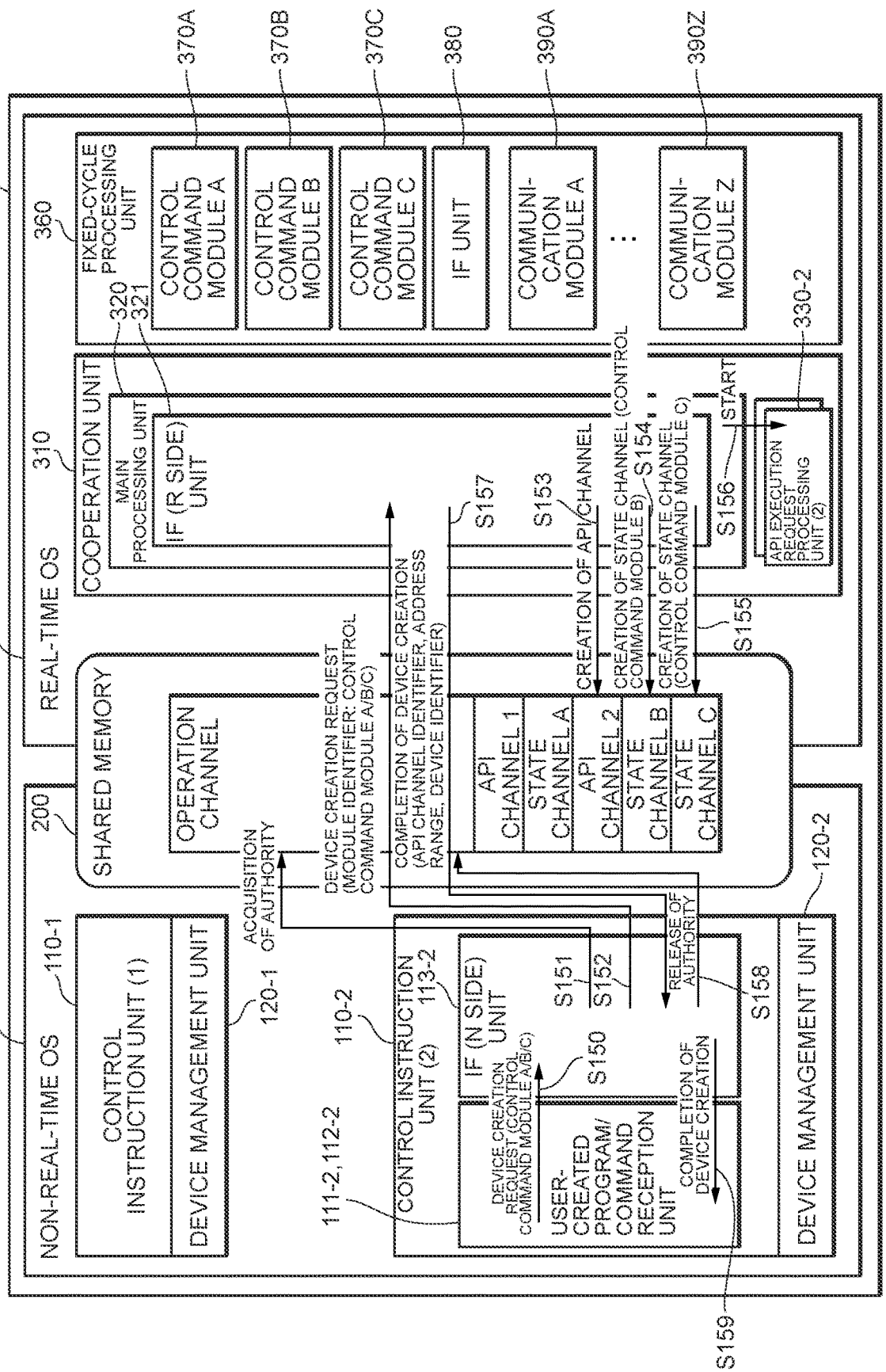
FIG. 8 is an illustration for describing one example of device creation processing.

FIG. 6 and FIG. 8 are illustrations for describing one example of device creation processing. In addition, FIG. 7 and FIG. 9 are illustrations each for describing one example of various kinds of management information which is generated in performing the device creation processing. By using FIG. 6 to FIG. 9, device creation processing, which is executed by each of a control instruction unit (1) 110-1 and a control instruction unit (2) 110-2 when they are started in this order by a user operation, will be described.

Precondition

First, conditions presupposed in describing device creation processing will be described. In FIG. 6 to FIG. 9, the control instruction unit (1) 110-1 calls an API function which is provided by the control command library 1121A. Similarly, the control instruction unit (2) 110-2 calls an API function which is provided by each of the control command library 1121A, the control command library 1121B, and the control command library 1121C.

A user-created program 111, a command reception unit 112, and an IF (N side) unit 113 which are included in the control instruction unit (1) 110-1 are referred to as a user-created program 111-1, a command reception unit 112-1, and an IF (N side) unit 113-1, respectively. In addition, a device management unit 120 associated with the control instruction unit (1) 110-1 is referred to as a device management unit 120-1.

A user-created program 111, a command reception unit 112, and an IF (N side) unit 113 which are included in the control instruction unit (2) 110-2 are referred to as a user-created program 111-2, a command reception unit 112-2, and an IF (N side) unit 113-2, respectively. In addition, a device management unit 120 associated with the control instruction unit (2) 110-2 is referred to as a device management unit 120-2.

Furthermore, an API execution request processing unit 330 associated with the control instruction unit (1) 110-1 (more specifically, a device generated by the control instruction unit (1) 110-1) is referred to as an API execution request processing unit (1) 330-1. Similarly, an API execution request processing unit 330 associated with the control instruction unit (2) 110-2 (more specifically, a device generated by the control instruction unit (2) 110-2) is referred to as an API execution request processing unit (2) 330-2.

Furthermore, it is assumed that in start setting information 400, the control command modules 370A to 370C and the communication modules 390A to 390Z are specified as start targets. The start setting information 400 is information that specifies the control command module 370 and communication module 390 which are operated on the fixed-cycle processing unit 360.

Device Creation Processing Performed by Control Instruction Unit (1)

By using FIG. 6 and FIG. 7, the device creation processing performed by the control instruction unit (1) will be described. When the control instruction unit (1) 110-1 is started by a user operation, the user-created program 111-1 notifies the command reception unit 112-1 of a preparation instruction for performing preparation for start of motion control of the control target device 20 (hereinafter, referred to as a "device creation request"). The notification is performed specifically by the user-created program 111-1 calling an API function that directs the creation of a device. Subsequently, the command reception unit 112-1 notifies the IF (N side) unit 113-1 of a device creation request (S100). The device creation request includes a module identifier (control command module A) of a control command module 370 that processes a control command which is issued by the user-created program 111-1 (scheduled to be issued in "motion control processing" described later). In addition, the command reception unit 112-1 starts the device management unit 120-1 before or after the processing procedure at step S100.

Next, the IF (N side) unit 113-1 checks whether the cooperation unit 310 has started on the real-time OS 300 side. If having not started, it transmits a start instruction of the cooperation unit 310 to the real-time OS 300 (S101). It should be noted that a state in which the cooperation unit 310 has not started refers to, for example, being immediately after starting the motion control device 10, or the like. The real-time OS which has received the start instruction starts the cooperation unit 310.

Subsequently, the main processing unit 320 of the cooperation unit 310 starts the control command module 370 and communication module 390 which are specified in the start setting information 400 (S102).

Subsequently, the IF (R side) unit 321 of the cooperation unit 310 which has been started by an instruction of the real-time OS 300 reserves in the shared memory 200 a memory area used for an operation channel (S103); and notifies the IF (N side) unit 113-1 that the reservation of the memory area is complete (that is, the operation channel has been created) (S104). At this time, the IF (R side) unit 321 notifies the IF (N side) unit 113-1 also of an address range reserved for the operation channel in the shared memory 200. The IF (R side) unit 321 stores the address range reserved for the operation channel in address management information (FIG. 7(e)). In addition, the IF (N side) unit 113-1 stores the address range of the operation channel in a resource (file, common variable, or the like) which can be referred to in common from each of the IF (N side) units 113. It should be noted that the IF (N side) unit 113-1 may store the address range of the operation channel further in address management information (FIG. 7(d)). FIG. 7(d) shows a state in which the address range of the operation channel is stored. The IF (N side) unit 113-1 having been notified that the creation of the operation channel is complete obtains a use authority of the operation channel so as to prevent the occurrence of a conflict with IF (N side) units 113 of the other control instruction units 110 on the use of the operation channel (S105).

If having obtained the use authority, the IF (N side) unit 113-1 notifies the IF (R side) unit 321 of a device creation request via the operation channel (S106). The device creation request includes the module identifier (control command module A) which has been notified of in the processing procedure at step S100.

The IF (R side) unit 321 having received the device creation request determines a device identifier as, for example, "D." In addition, the IF (R side) unit 321 reserves a memory area used for an API channel and also determines an API channel identifier as, for example, "API channel 1" (S107). In addition, the IF (R side) unit 321 associates the determined device identifier and API channel identifier with each other and stores in device management information (FIG. 7(b)).

In addition, the IF (R side) unit 321 reserves, in the shared memory 200, a memory area which is used for a state channel A corresponding to the control command module 370A (S108). The IF (R side) unit 321 holds a correspondence relation between the created state channel A and the control command module 370A as state channel management information (FIG. 7(c)). In addition, the IF (R side) unit 321 stores the address range of a memory area reserved for each of the API channel 1 and state channel A, in address management information (FIG. 7(e)).

Subsequently, the main processing unit 320 starts the API execution request processing unit (1) 330-1 (S109). It should be noted that the processing procedure at step S107 to step S109 are not limited to being in an order shown in FIG. 6 and may be performed in any order.

Subsequently, the IF (R side) unit 321 notifies the IF (N side) unit 113-1 that the creation of a device is complete (the creation of the API channel 1 and the state channel A is complete) (S110). This notification includes the created API channel identifier (API channel 1), the address ranges of memory areas reserved for the API channel 1 and the state channel A, and the device identifier (D1).

The IF (N side) unit 113-1 having received a notification that the creation of a device is complete stores the address range of the memory area reserved for each of the API channel 1 and the state channel A, in the address management information (FIG. 7(*d*)). Subsequently, the IF (N side) unit 113-1 releases the use authority of the operation channel (S111) and notifies the command reception unit 112-1 that the creation of a device is complete. In addition, the command reception unit 112-1 notifies the user-created program 111-1 that the creation of a device is complete (S112). This notification includes the device identifier (D1) and the API channel identifier (API channel 1). This notification may be, for example, a return value of the API function that directs the creation of a device.

The user-created program 111-1 associates the device identifier (D1) and the API channel identifier (API channel 1) with each other which have been notified of, and holds them as device management information (FIG. 7(*a*)). It should be noted that holding as device management information intends, specifically, to hold, by storing in variables, the device identifier and API channel identifier which have been notified as return values of the API function that directs the creation of a device; however, it is not limited thereto and for example, holding in a file or the like is also possible.

Device Creation Processing Performed by Control Instruction Unit (2)

By using FIG. 8 and FIG. 9, the device creation processing performed by the control instruction unit (2) will be described. When the control instruction unit (2) 110-2 is started by a user operation, the user-created program 111-2 notifies the command reception unit 112-2 of a device creation request. The command reception unit 112-2 notifies the IF (N side) unit 113-2 of a device creation request (S150). The device creation request includes module identifiers (control command module A, control command module B, and control command module C) of control command modules 370 that process a control command which is issued by the user-created program 111-2 (scheduled to be issued in "motion control processing" described later). In addition, the command reception unit 112-2 starts the device management unit 120-2 before or after the processing procedure at step S100.

Next, the IF (N side) unit 113-2 checks whether the cooperation unit 310 has started on the real-time OS 300 side. Here, since the control instruction unit (1) 110-1 has already started the cooperation unit 310, the IF (N side) unit 113-2 does not perform start processing of the cooperation unit 310. Subsequently, the IF (N side) unit 113-2 obtains a use authority of the operation channel (S151).

If having obtained the use authority, the IF (N side) unit 113-2 notifies the IF (R side) unit 321 of a device creation request via the operation channel (S152). The device creation request includes module identifiers (control command module A, control command module B, and control command module C). It should be noted that the IF (N side) unit 113-2 obtains the address range of the operation channel from a resource (file, common variable, or the like) which can be referred to in common from each of the IF (N side) units 113. In addition, the IF (N side) unit 113-2 may store the address range of the operation channel in address management information (FIG. 9(*d*)). FIG. 9(*d*) shows a state in which the address range of the operation channel is stored.

The IF (R side) unit 321 having received the device creation request determines a device identifier as, for example, "D2." In addition, the IF (R side) unit 321 reserves, in the shared memory 200, a memory area used for an API channel and also determines an API channel identifier as, for example, "API channel 2" (S153). In addition, the IF (R side) unit 321 associates the determined device identifier and API channel identifier with each other and adds in device management information (FIG. 9(*b*)).

Subsequently, the IF (R side) unit 321 reserves, in the shared memory 200, memory areas which are used for the state channel A corresponding to the control command module 370A, a state channel B corresponding to the control command module 370B, and a state channel C corresponding to the control command module 370C. It should be noted that since the state channel A corresponding to the control command module 370A has already been created (step S108 in FIG. 6), the IF (R side) unit 321 performs reservation of memory areas which are used for the state channel B and the state channel C (S154, S155).

Subsequently, the IF (R side) unit 321 adds the respective correspondences of the created state channel B and the created state channel C to the control command module 370B and the control command module 370C, to state channel management information (FIG. 9(*c*)) which is held by the IF (R side) unit 321. In addition, the IF (R side) unit 321 adds the address range of a memory area reserved for each of the API channel 2, the state channel B, and the state channel C, to address management information (FIG. 9(*e*)) held by the IF (R side) unit 321.

Subsequently, the IF (R side) unit 321 notifies the IF (N side) unit 113-2 that the creation of a device is complete (the creation of the API channel 2, the state channel B, and the state channel C is complete) (S157). This notification includes: the address range of the memory area reserved for each of the API channel 2, the state channel A, the state channel B, and the state channel C; the API channel identifier (API channel 2); and the device identifier (D2).

The IF (N side) unit 113-2 having received a notification that the creation a device is complete stores the address range of the memory area which is reserved for each of the API channel 2, the state channel A, the state channel B, and the state channel C, in the address management information (FIG. 9(*d*)).

Subsequently, the IF (N side) unit 113-2 releases the use authority of the operation channel (S158) and notifies the command reception unit 112-2 that the creation of a device is complete. In addition, the command reception unit 112-2 notifies the user-created program 111-2 that the creation of a device is complete (S159). This notification includes the device identifier (D2) and the API channel identifier (API channel 2). The user-created program 111-2 associates the device identifier (D2) and the API channel identifier (API channel 2) which have been notified of, and holds as device management information (FIG. 9(*a*)).

It should be noted that in the device creation processing which has been described above, an IF (R side) unit 321 side which has obtained the device creation request creates both the API channel and the state channel. However, the present embodiment is not limited thereto. For example, it may be possible that in a processing procedure from step S100 to step S112 in FIG. 6 and step S150 to step S159 in FIG. 7, an API channel is created and after that, a similar processing procedure is repeated so as to perform the creation of an API channel and the creation of a state channel at different timings.

Specifically, the user-created program 111 notifies the IF (N side) unit 113 of a device creation request not including a module identifier; and the IF (N side) unit 113 similarly notifies the IF (R side) unit 321 of a device creation request not including a module identifier. The IF (R side) unit 321 having received the device creation request creates an API channel and notifies the IF (N side) unit 113 that the creation of a device is complete. The IF (N side) unit 113 notifies the user-created program 111 that the creation of a device is complete.

After that, the user-created program 111 notifies, for example, at a timing such as before issuing a control command, the IF (N side) unit 113 of a state channel creation request including a module identifier of the control command module 370 that processes the control command; and the IF (N side) unit 113 similarly notifies the IF (R side) unit 321 of a state channel creation request including the module identifier. The IF (R side) unit 321 having received the state channel creation request creates a state channel and notifies the IF (N side) unit 113 that the creation of a state channel is complete. The IF (N side) unit 113 notifies the user-created program 111 that the creation of a state channel is complete.

Motion Control Processing

Subsequently, a processing procedure when the motion control device 10 performs motion control of the control target device 20 will be specifically described.

Precondition

In a description below, the control instruction unit 110 performs motion control for a control target device (axis 1) 20-1 corresponding to an axis 1 and a control target device (axis 2) 20-2 corresponding to an axis 2, by using the control command module 370A that can perform PTP control. In addition, the device identifier of a device created by the control instruction unit 110 is D1 and an API channel identifier corresponding to the device is API channel 1. In addition, a state channel A corresponding to the API channel 1 and the control command module 370A has already been created. Furthermore, in the description below, the control instruction unit 110 simultaneously controls two axes of the axis 1 and the axis 2 by calling an API function related to PTP control.

Figure 10:
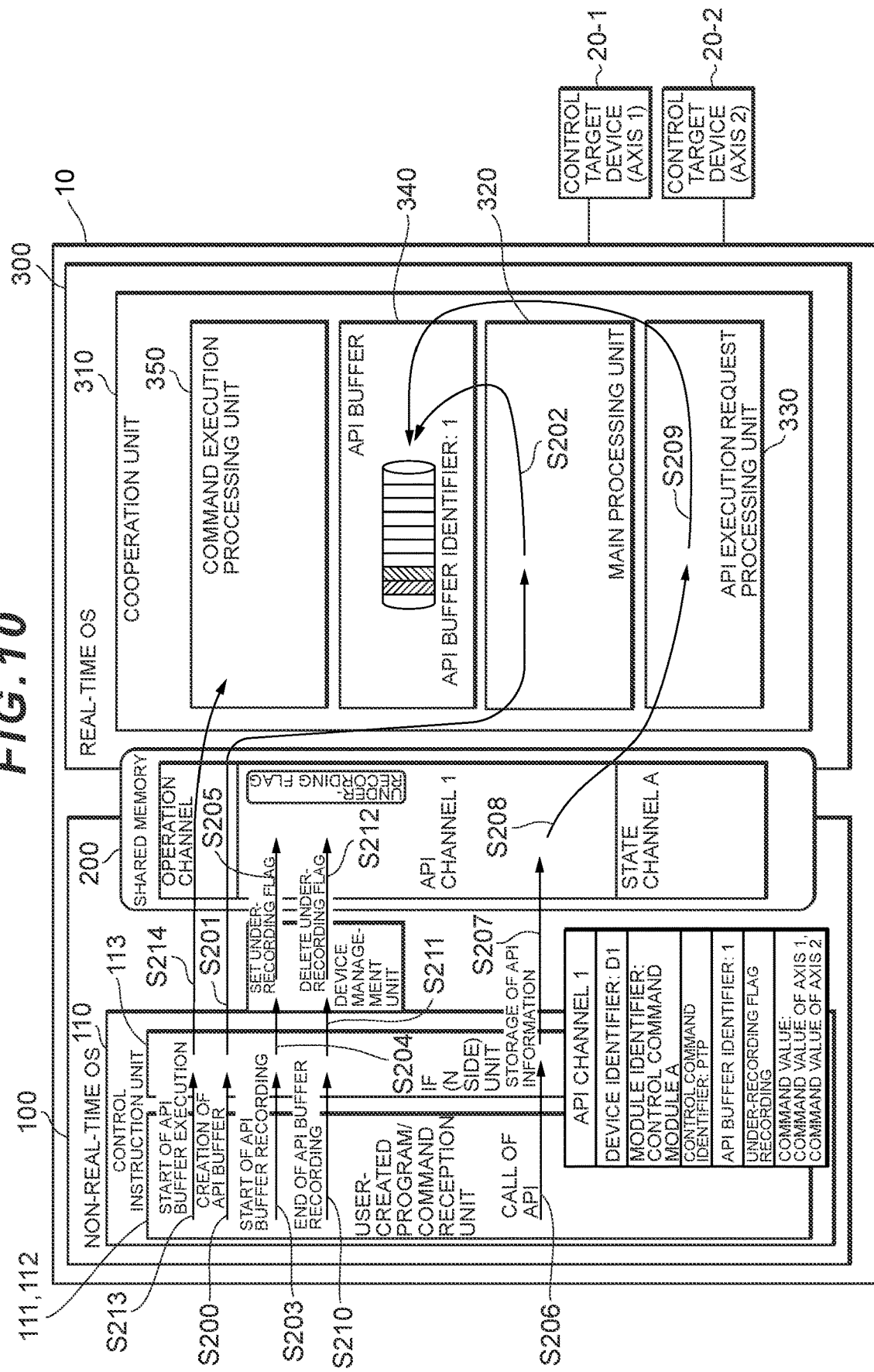
FIG. 10 is an illustration that shows one example of motion control processing which is performed by the motion control device.
Figure 11:
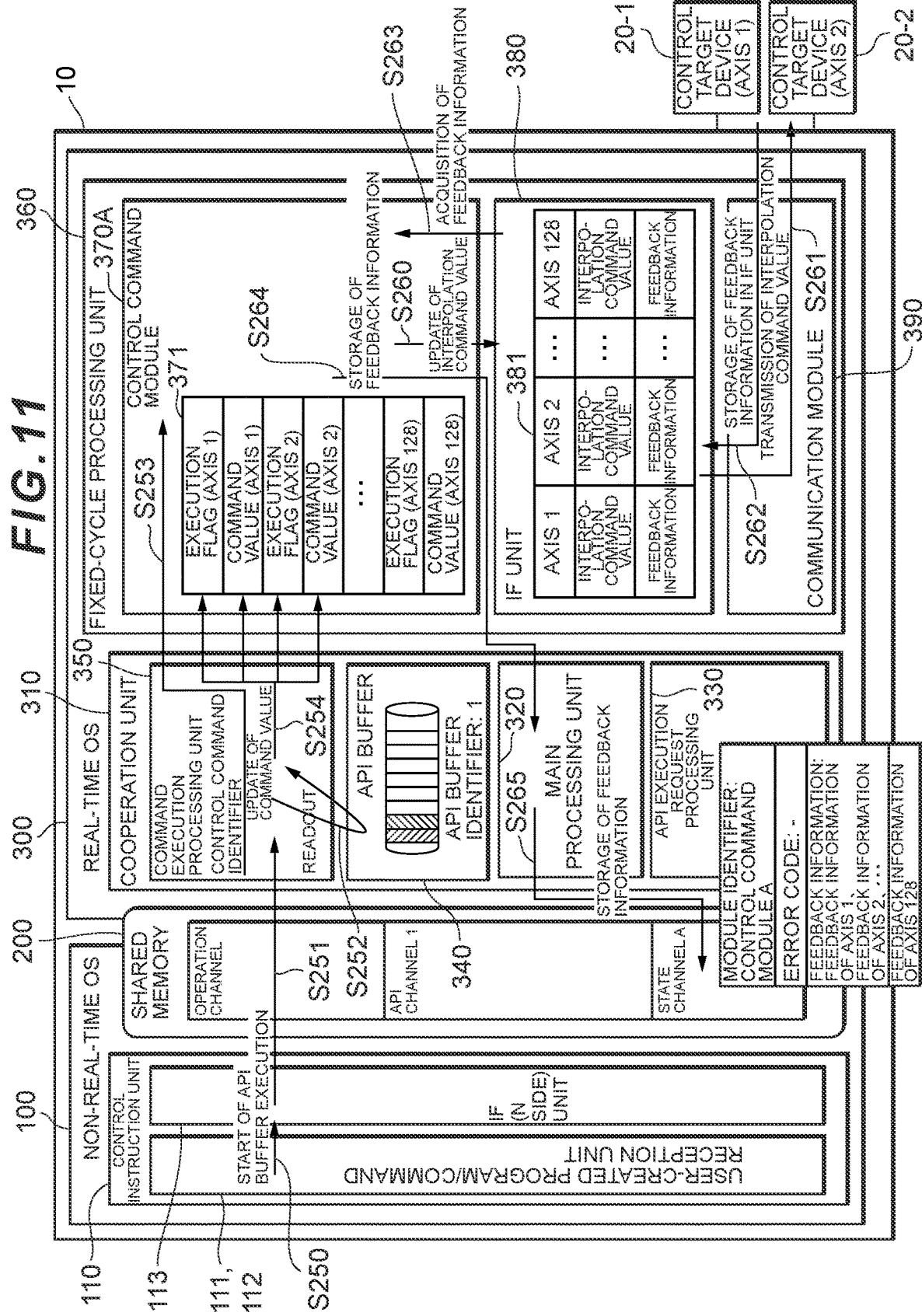
FIG. 11 is an illustration that shows one example of the motion control processing which is performed by the motion control device.

FIG. 10 and FIG. 11 are illustrations each showing one example of the motion control processing which is performed by the motion control device 10. First, by using FIG. 10, a processing procedure from the creation of an API buffer 340 to queuing of API information in the API buffer 340 will be described.

Creation of API Buffer, Storage of API Information

First, the user-created program 111 calls an API function that directs the creation of an API buffer 340. When the API function is called, the command reception unit 112 notifies the IF (N side) unit 113 of the creation of the API buffer (S200). This notification includes an API buffer identifier corresponding to the API buffer 340 to be created. The API buffer identifier may be determined in any manner; it may be paid out from, for example, the main processing unit 320 before performing a processing procedure at step S200. Here, it is assumed that the API buffer identifier is "1."

The IF (N side) unit 113 requests, via the operation channel, the main processing unit 320 to create the API buffer 340. The request includes the API buffer identifier.

The main processing unit 320 creates the API buffer 340 (reserves a memory area) corresponding to the API buffer identifier "1" (S202).

Subsequently, when the user-created program 111 calls an API function that directs the start of recording of API information (start of queueing of API information) with the API buffer identifier "1" specified, the command reception unit 112 notifies the IF (N side) unit 113 of the start of recording of the API information (S203). The IF (N side) unit 113 notifies the device management unit 120 of the start of recording of the API information (S204). The device management unit 120 sets "1" for the "API buffer identifier" of the API channel 1 and also sets an "under-recording flag" (S205).

The under-recording flag is used for switching whether to pass to the fixed-cycle processing unit 360 the API information corresponding to the API function called by the user-created program 111 after temporarily queuing it in the API buffer 340 or to pass the API information corresponding of the API function called by the user-created program 111 directly to the fixed-cycle processing unit 360 without queueing it in the API buffer 340. Specifically, when the API information is stored in the API channel while the flag is being set, the API information stored in the API channel is queued in the API buffer 340 by the API execution request processing unit 330. On the other hand, when the API information is stored in the API channel while the flag is not being set, the API information stored in the API channel is obtained by the API execution request processing unit 330, passed to the fixed-cycle processing unit 360, and executed in the fixed-cycle processing unit 360.

Subsequently, the user-created program 111 specifies a command value directing the axis 1, a command value directing the axis 2, and a device identifier (here, D1) as arguments; and calls an API function for performing PTP control. When the API function is called, the command reception unit 112 notifies the IF (N side) unit 113 of API information corresponding to the called API function (S206).

Subsequently, the IF (N side) unit 113 stores the API information in the API channel 1 (S207). Specifically, "D1," "control command module A," and "PTP" are stored in the "device identifier," "module identifier," and "control command identifier" of the API channel 1, respectively. In addition, in the "command value," the command value of the axis 1 and the command value of the axis 2 are stored. In the "API buffer identifier" and "under-recording flag," information stored in a processing procedure at step S205 is stored as it is.

The "module identifier" to be stored in the API channel is not limited to an identifier that can explicitly specify the control command module 370; and may be an identifier that implicitly indicates the control command module 370. In addition, the "module identifier" may be omitted from the API channel. This is because, in the present embodiment, the control command module 370 that executes a control command indicated by the "control command identifier" is provided in one unit and therefore, the cooperation unit 310 can uniquely specify the control command module 370 based on the control command identifier.

The API execution request processing unit 330 obtains, when the "under-recording flag" of the API channel 1 is set, the API information ("device identifier," "module identifier," "control command identifier," "API buffer identifier," and "command value") stored in the API channel 1 (S208). In addition, it queues the obtained API information in the API buffer 340 corresponding to the "API buffer identifier" which has been obtained at step S208 (S209).

When the control instruction unit 110 calls a plurality of APIs, the processing procedure from step S206 to step S209 is repeated, thereby causing a plurality of pieces of API information to be queued in the API buffer 340.

When calling of the API functions which causes queuing in the API buffer 340 is complete, the user-created program 111 calls an API function that directs the ending of the recording of the API information to the API buffer 340 (end the queuing of the API information). The control instruction unit 110 notifies the IF (N side) unit 113 of the ending of the recording of the API information to the API buffer 340 (S210); and the IF (N side) unit 113 provides the notification to the device management unit 120 (S211). The device management unit 120 erases the under-recording flag set in the API channel 1 (S212).

The API buffer 340 is generated by an instruction of the user-created program 111 (more specifically, a device); however, one user-created program 111 can create a plurality of API buffers 340. In addition, a plurality of user-created programs 111 can share the same API buffer 340. In the present embodiment, one user-created program 111 is allowed to use a plurality of API buffers 340, thereby allowing a plurality of complicated motion controls to be simultaneously operated. In addition, a plurality of user-created programs 111 are allowed to share the same API buffer 340, thereby allowing flexibility when a user creates a user-created program 111 to be enhanced.

Control of Control Target Device

Next, by using FIG. 11, a processing procedure in controlling the control target device (axis 1) 20-1 and the control target device (axis 2) 20-2 according to the API information queued in the API buffer 340 will be described.

As shown in FIG. 11, the control command module 370A holds, for a plurality of axes which can be simultaneously controlled by the control command module 370A, a memory area 371 that stores, for each of the axes, a command value and an execution flag which indicates that the command value has been updated. In an example of FIG. 11, the control command module 370A can simultaneously control up to 128 axes and has the memory area 371 for storing a command value and an execution flag for each of axis 1 to axis 128. In the execution flag, either "under execution" or "executed" is stored. The "under execution" indicates that the control command module 370A is controlling an axis according to a motion control cycle and "executed" indicates a state in which control of the axis is complete.

Here, the IF unit 380 has, for a plurality of axes that can be simultaneously controlled by the fixed-cycle processing unit 360, a memory area 381 for storing an interpolation command value and feedback information for each of the axes. In the example of FIG. 11, the IF unit 380 has a memory area 381 that can store an interpolation command value and feedback information for each of axis 1 to axis 128.

First, the user-created program 111 calls an API function indicating the start of execution, for an API buffer 340 corresponding to an API buffer identifier (1). Specifically, the user-created program 111 sets the API buffer identifier (1) as an argument of the API function. Subsequently, the command reception unit 112 notifies the IF (N side) unit 113 that processing of retrieving API information from the API buffer of the API buffer identifier (1) and passing it to the control command module 370 should be started (S250). The IF (N side) unit 113 notifies, via the operation channel, the command execution processing unit 350 that processing of retrieving API information from the API buffer of the API buffer identifier (1) and passing it to the control command module 370 should be started (S251).

The command execution processing unit 350 which has received the notification from the IF (N side) unit 113 obtains API information which is stored in the specified API buffer 340; and passes it to the fixed-cycle processing unit 360. Specifically, the command execution processing unit 350 obtains one piece of API information from the API buffer 340 corresponding to the API buffer identifier "1." In the "module identifier," "control command identifier," and "command value" of the obtained API information, "control command module A," "PTP," and "command value of the axis 1 and command value of the axis 2" are stored, respectively. The command execution processing unit 350 notifies the control command module 370A, which is specified by the "module identifier" of the API information, of a control command identifier to be executed (here, PTP) (S253). Subsequently, the command execution processing unit 350 updates the command value of the axis 1 and the command value of the axis 2 in the memory area 371 of the control command module 370A with the command value of the axis 1 and the command value of the axis 2 which are obtained from the API information; and also changes the execution flag of the axis 1 and the execution flag of the axis 2 to "under execution" (S254).

Subsequently, the control command module 370A calculates interpolation command values for the axis 1 and the axis 2 based on the command values of the axis 1 and the axis 2 which are stored in the memory area 371; and stores the calculated interpolation command value in the IF unit 380 (S260). The interpolation command value is calculated by a predetermined logic according to the content of a control command. As the predetermined logic, for example, a control logic in conventional PTP control can be used. The communication module 390 obtains the interpolation command values of the axis 1 and the axis 2 which are stored in the IF unit 380; converts them into signals according to communication interface standards of the axis 1 and the axis 2; and transmits them to the control target device (axis 1) 20-1 and the control target device (axis 2) 20-2 (S261).

The processing procedure of step S260 and step S261 are repeated according to a motion control cycle (for example, at an interval of 1 ms or an interval of 0.5 ms), thereby causing the axis 1 and the axis 2 to smoothly operate according to the interpolation command values. When the states of the axis 1 and the axis 2 reach their command values, the control command module 370A updates the execution flags of the axis 1 and the axis 2 to "executed." The command execution processing unit 350 which has detected that the execution flags of the axis 1 and the axis 2 have been updated to "executed," then, reads out the API information stored in the API buffer 340; and repeatedly performs the processing procedure of step S253 and step S254 which have been described above. Thus, the command value in the memory area 371 of the control command module 370A is updated and the processing procedure of step S260 and step S261 are executed again. The operation of a processing procedure from step S252 to step S261 which has been described above is repeated until the API buffer 340 becomes free.

Here, the communication module 390 obtains feedback information from the control target device (axis 1) 20-1 and the control target device (axis 2) 20-2; converts it into feedback information of a common signal format; and stores it in the IF unit 380 (S262). Subsequently, the control command module 370A obtains feedback information for each of the axes which has been stored in the IF unit 380 (S263). The processing procedure of step S262 and step S263 may be repeated according to a motion control cycle; or may be repeated at a cycle different from the motion control cycle (for example, at a cycle of several ms).

The control command module 370A notifies the main processing unit 320 of the obtained feedback information of the axis 1 and axis 2 (S264). The main processing unit 320 stores the notified feedback information of the axis 1 and the axis 2, in the state channel A (S265). When the user-created program 111 calls an API function for reading out feedback information corresponding to the state channel A, the command reception unit 112 notifies the IF (N side) unit 113 that the feedback information stored in the state channel A should be read out. The feedback information which has been read out by the IF (N side) unit 113 is transmitted to the user-created program 111 via the command reception unit 112. Thus, the user-created program 111 can grasp how each axis is operating; and for example, can perform complicated motion control such as switching control commands based on an axis state.

In addition, the control command module 370A, in a processing procedure at step S260, may, for example, refer to the states of the axis 1 and the axis 2 which are included in the feedback information, for each motion control cycle; and calculate interpolation command values in the next motion control cycle while checking whether each of the axis 1 and the axis 2 is performing an intended operation.

Figure 12:
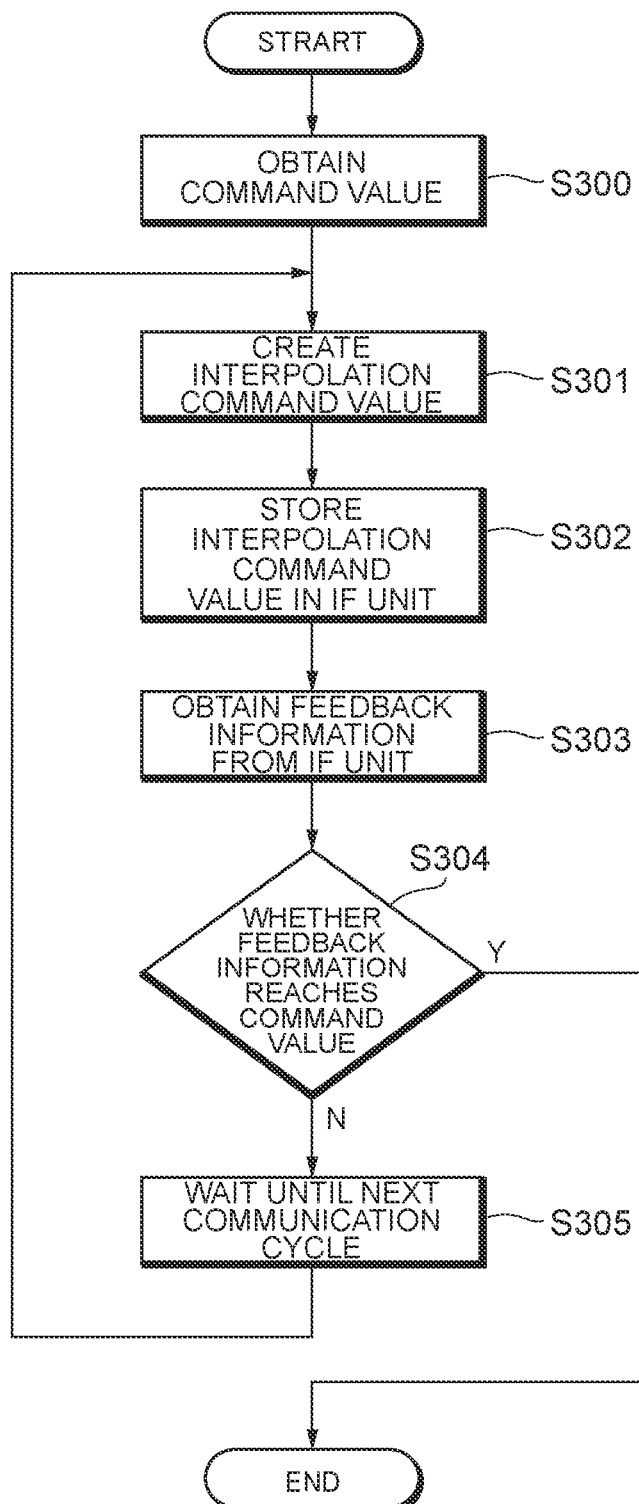
FIG. 12 is a flowchart that shows one example of a processing procedure which are performed by a control command module.

FIG. 12 is a flowchart that shows one example of a processing procedure which is performed by the control command module 370. First, the control command module 370 obtains a command value of an axis whose execution flag is set to "under execution" from the memory area 371 (S300). Subsequently, the control command module 370 calculates a command value for one motion control cycle (that is, an interpolation command value) (S301) based on the command value; and stores the calculated interpolation command value in the memory area 381 of the IF unit 380 (S302). Subsequently, the control command module 370 obtains feedback information for each of the axes from the IF unit 380 (S303). Then, the control command module 370 determines, for the axis whose command value has been obtained at step S300, whether the feedback information has reached the command value (S304). If the command value has been reached, the execution flag of the axis is set to "executed" and the processing is ended. If the command value has not been reached, a wait is performed until the next motion control cycle (S305) and an advance to a processing procedure at step S301 is made. It should be noted that it may be possible to omit the processing procedure at step S303 and to replace the processing procedure at step S304 with performing determination of whether the axis operation has reached the command value by using the modern control theory without using the feedback information.

Error Handling Processing

Crash of Control Instruction Unit

Next, a processing procedure which is performed when a control instruction unit 110 has crashed for some reason will be described. The device management unit 120 regularly monitors that a control instruction unit 110 is existent (operating) and writes, during the existence of the control instruction unit 110, an existence report indicating that the control instruction unit 110 is existent, to an API channel. The IF (R side) unit 321 periodically obtains the presence of the existence report which shows each of the control instruction units 110 is existent, by referring to each of the API channels; and when the existence report is not performed for a predetermined period, an API channel corresponding to a control instruction unit 110 for which the existence report has not been performed is discarded (erased) (a memory area of the API channel is released). Hereafter, a processing procedure when a control instruction unit has crashed will be described specifically by using drawings.

Figure 13:
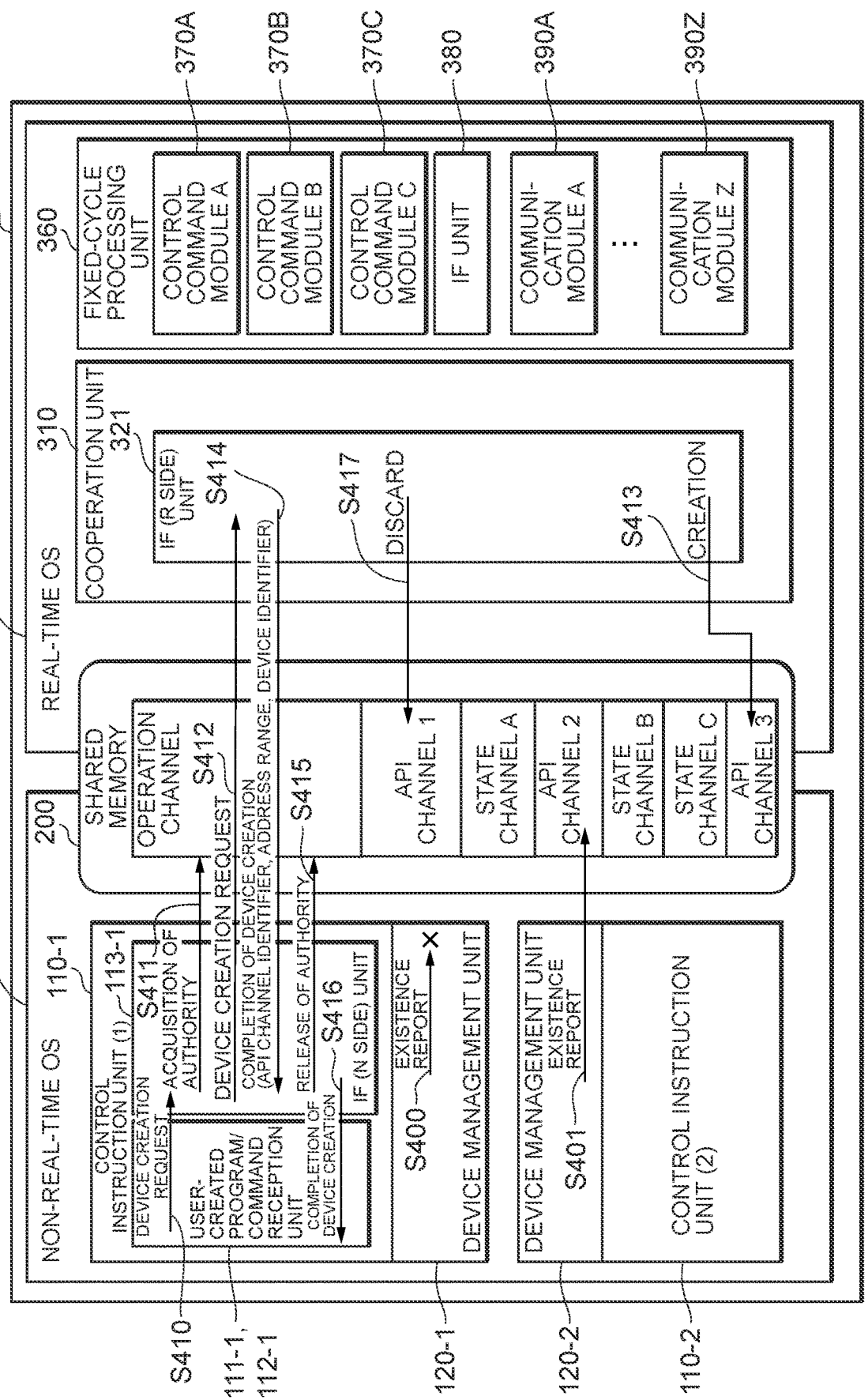
FIG. 13 is an illustration that shows one example of a processing procedure when a control instruction unit has crashed.

FIG. 13 is an illustration that shows one example of a processing procedure when a control instruction unit has crashed. In a description of FIG. 13, it is assumed that the same precondition as the precondition described before in "(Device creation processing)" is applied.

The device management unit 120-1 and the device management unit 120-2 are configured so as to periodically write an existence report to the API channel 1 and the API channel 2, respectively (S400, S401). The existence report may be, for example, a timestamp. In addition, a cycle is freely selected; for example, may be a cycle of a 1-second interval or a 10-second interval. Here, it is assumed that since the control instruction unit (1) 110-1 has crashed, the device management unit 120-1 does not write an existence report to the API channel 1 (S400).

After that, when the control instruction unit (1) 110-1 restarts, the control instruction unit (1) 110-1 notifies the IF (N side) unit 113-1 of a device creation request (S410). The processing procedures at step S411 and step S412 are the same as those at step S105 and step S106 in FIG. 6, respectively; and therefore, their descriptions will be omitted. It should be noted that the IF (N side) unit 113-1 obtains the address range of the operation channel from a resource (file, common variable, or the like) which can be referred to in common from each of the IF (N side) units 113.

Subsequently, the IF (R side) unit 321 reserves in the shared memory 200 a memory area which is used for an API channel (S413). In addition, the IF (R side) unit 321 determines a device identifier and an API channel identifier. Here, it is assumed that the device identifier is determined as, for example, "D3," and the API channel identifier is determined as, for example, "API channel 3." The IF (R side) unit 321 stores the reserved address range of the API channel 1 in the address management information and adds, to the device management information, a record in which the device identifier (D3) and the API channel 3 are associated. A processing procedure from step S414 to step S416 is the same as the one from step S110 to step S112 in FIG. 6, respectively; and therefore, the description thereof will be omitted.

Subsequently, the IF (R side) unit 321 detects that an existence report has not been written in the API channel 1 for a predetermined period and discards the API channel 1 (S417). In addition, the IF (R side) unit 321 deletes a record including the API channel 1 from the device management information; and further deletes a record in which the address range of the API channel 1 is stored, from the address management information.

It should be noted that it is assumed that depending on a timing at which the IF (R side) unit 321 detects that an existence report has not been written, the processing procedure at step S417 comes prior to the processing procedure at step S414. In this case, the IF (R side) unit 321 may reserve (reuse), in reserving a memory area used for an API channel in the shared memory 200, the memory area of the discarded API channel 1 (that is, a free memory area) as a memory area of the API channel that is newly generated.

In the present embodiment, two or more operation channels are not reserved in the shared memory 200; and in addition, the state channel is not reserved for more than the number of control command modules 370 installed on the real-time OS 300. On the other hand, the number of API channels reserved in the shared memory 200 changes according to the number of control instruction units 110 to be started and the number of devices created by the control instruction units 110. Therefore, if an API channel which is no longer used remains in the shared memory 200, a free resource of the shared memory 200 becomes insufficient, so that the motion control device 10 itself may become unable to operate. According to the error handling processing described above, the API channel for which an existence report is no longer written is erased from the shared memory 200. This can reduce the possibility that the resource of the shared memory 200 becomes insufficient due to crashing of the control instruction unit 110 again and again.

In addition, according to the error handling processing described above, if the control instruction unit 110 crashes, deletion and creation only of an API channel related to the control instruction unit 110 are performed; and API channels and state channels which are used by the other control instruction units 110 that have not crashed remain reserved as is in the shared memory 200. That is, even when a control instruction unit 110 crashes, the other control instruction units 110 which have not crashed can continue operating without receiving any influence.

Crash of Cooperation Unit

If the cooperation unit 310 crashes, the IF (R side) unit 321 loses the device management information (FIG. 9(*b*)), state channel management information (FIG. 9(*c*)), and address management information (FIG. 9(*e*)) which are stored by itself. If losing these pieces of information, the IF (R side) unit 321 becomes unable to access each channel.

Therefore, in the present embodiment, in a predetermined area of the shared memory 200, information indicating the address ranges reserved for the operation channel, API channel, and state channel and information indicating for which of the channels a memory area of each of the address ranges is reserved are stored. When the cooperation unit 310 crashes and restarts, the cooperation unit 310 accesses the predetermined area and thereby recognizes the address ranges in which the operation channel, API channel, and state channel are reserved, and the like; and based on the recognized information, generates device management information, state channel management information, and address management information.

Thus, even in a case where the cooperation unit 310 crashes, the operation of the motion control device 10 can be restored without performing device generation processing and the like again on a control instruction unit 110 side.

Protocol Conversion Processing

The motion control device 10 can simultaneously control a plurality of control target devices 20 of different communication interface standards. In order to realize such control, the memory area 381 of the IF unit 380 holds interpolation command values and feedback information according to a common signal format. The common signal format may be any format; however, it is preferable to be a format that includes all necessary items of a plurality of communication interface standards so as to allow interconversion (protocol conversion) between the plurality of communication interfaces.

The control command module 370 generates an interpolation command value according to the common signal format and stores it in the IF unit 380. In addition, the communication module 390 obtains an interpolation command value from the IF unit 380; converts the obtained interpolation command value from the common signal format into a signal format which is compliant with the communication interface standard of a control target device 20 with which the communication module 390 transmits and receives a signal; and then, transmits it to the control target device 20.

Similarly, the communication module 390 receives feedback information from the control target device 20; performs protocol conversion of the received feedback information from a signal format which is compliant with the communication interface standard of the control target device 20 into the common signal format; and then, stores it in the IF unit 380.

An axis which is taken charge of by each of the communication modules 390 (the same meaning as a control target device 20 taken charge of by each of the communication modules 390) and the address range for each axis in the IF unit are defined in mapping information. Each of the communication modules 390 obtains an interpolation command value by accessing, based on the mapping information, a memory area 381 which is reserved for an axis (control target device 20) that should be taken charge of by each of the communication modules 390; and stores feedback information in the memory area 381. Similarly, each of the control command modules 370 obtains an interpolation command value by accessing, based on the mapping information, a memory area 381 which is reserved for each axis; and stores feedback information in the memory area 381.

FIG. 14 is an illustration that shows one example of mapping information. In mapping information 410, for each axis (control target device 20), a communication module 390 that takes charge of each axis and an identifier (slave number) used in a communication interface standard for uniquely specifying a control target device 20 are associated with each other.

In an example of FIG. 14, it is defined that an axis 1 is taken charge of by a communication module 390 compliant with EtherCAT (registered trademark) and corresponds to a control target device 20 that is connected to a slave 1 in EtherCAT (registered trademark). Similarly, it is defined that an axis 2 is taken charge of by a communication module 390 compliant with EtherCAT (registered trademark) and corresponds to a control target device 20 that is connected to a slave 2 in EtherCAT (registered trademark). Similarly, it is defined that an axis 3 is taken charge of by a communication module 390 compliant with RTEX (registered trademark) and corresponds to a control target device 20 that is connected to a slave 1 in RTEX (registered trademark). It should be noted that the mapping information may be stored, for example, in a predetermined area on the real-time OS 300 which can be accessed by the plurality of communication modules 390. Alternatively, each of the communication modules 390 may hold, for itself, mapping information about an axis related to itself. For example, it may be possible that a communication module 390 compliant with EtherCAT (registered trademark) holds mapping information in which slave numbers corresponding to the axis 1 and the axis 2 are stored and a communication module 390 compliant with RTEX (registered trademark) holds mapping information in which a slave number corresponding to the axis 3 is stored.

FIG. 15 is an illustration for describing one example of a processing procedure of protocol conversion processing. The communication module 390-1 and the communication module 390-2 each obtains information on axes that should be controlled by itself by reading mapping information 410 at a timing of startup according to an instruction from the cooperation unit 310 (step S102 in FIG. 6) or at least before starting communication with control target devices 20. It should be noted that in the following processing procedure, processing of reading the interpolation command value and feedback information of each axis which are stored in the IF unit 380 and processing of writing the interpolation command value and feedback information of each axis to the IF unit 380 are performed by, for example, the control command module 370 and the communication module 390 calling a predetermined function.

First, the control command module 370 updates the interpolation command values of the axis 1 to the axis 3 which are stored in the memory area 381 of the IF unit 380, according to a common signal format (S500). The communication module 390-1 obtains the interpolation command value of the axis 1 and the interpolation command value of the axis 2 (S501, S502); and converts the signal format of the obtained interpolation command value from the common signal format to the signal format of EtherCAT (registered trademark). Subsequently, the communication module 390-1 transmits the interpolation command value of the axis 1 and the interpolation command value of the axis 2 for which signal format conversion is complete to the control target device 20-1 and the control target device 20-2, respectively (S504, S505). Similarly, the communication module 390-2 obtains the interpolation command value of the axis 3 (S503); and converts the signal format of the obtained interpolation command value from the common signal format to the signal format of RTEX (registered trademark). Subsequently, the communication module 390-2 transfers the interpolation command value of the axis 3 for which the conversion has been performed, to the control target device 20-3 (S506).

Next, the communication module 390-1 obtains the feedback information of the axis 1 and the feedback information of the axis 2 (S510, S511) from the control target device 20-1 and the control target device 20-2; and converts the signal format of the obtained feedback information from the signal format of EtherCAT (registered trademark) to the common signal format. Subsequently, the communication module 390-1 stores the feedback information of the axis 1 and the feedback information of the axis 2, for which the conversion has been performed, in the memory area 381 of the IF unit 380 (S513, S514).

Similarly, the communication module 390-2 obtains the feedback information of the axis 3 from the control target device 20-3 (S512); and converts the signal format of the obtained feedback information from the signal format of RTEX (registered trademark) to the common signal format. Subsequently, the communication module 390-2 stores the feedback information of the axis 2, for which the conversion has been performed, in the memory area 381 of the IF unit 380 (S515). The control command module 370 obtains the feedback information of the axis 1 to the axis 3 which is stored in the memory area 381 of the IF unit 380 (S516).

In the protocol conversion processing described above, the processing procedure from step S500 to step S516 is repeatedly performed for each motion control cycle.

SUMMARY

The above has described the motion control device 10 according to an embodiment. When motion control is performed for control target devices 20, in order to operate a plurality of the control target devices 20 with high accuracy in synchronization with each other, it is necessary to continue transmitting interpolation commands to the control target devices 20 at each motion control cycle (for example, every 1 ms or 0.5 ms). On a non-real-time OS 100 such as Windows (registered trademark), the operation speed of a program under execution becomes slow when a processing load becomes higher due to an influence such as background processing or the like performed by the OS itself, and therefore, it is difficult to continue transmitting an interpolation command to the control target devices 20 in a cycle of 1 ms or 0.5 ms.

On the other hand, in the present embodiment, such a configuration has been adopted that the non-real-time OS 110 side issues a control command (API information) for over a plurality of motion control cycles and the real-time OS 300 side obtains the control command via the API buffer 340 and issues an interpolation command for each of the motion control cycles. This has made it possible that changes in the processing speed on the non-real-time OS 110 are absorbed and a smooth and highly-accurate motion control is executed by using a general-purpose information processing device on which the non-real-time OS 110 and real-time OS 300 have been installed. In addition, when a plurality of control commands are issued, the plurality of control commands are stored in the API buffer 340. This has made it possible that a continuous motion control (motion control sequence) by each control command is smoothly executed.

In addition, in the present embodiment, the control instruction unit 110 is arranged on the non-real-time OS 110 side, so that a user interface of a design familiar to users can be provided while realizing real-time processing according to a motion control cycle.

In addition, in the present embodiment, resources such as an API channel, and the like which are required in performing motion control are prepared for each control instruction unit 110 (more specifically, for each device). This has made it possible that resources required for a series of operations in which a control instruction unit 110 controls a control target device 20 by issuing a control command are separated for each control instruction unit 110 (that is, for each user-created program 111) and if an abnormality such as a crash occurs in one control instruction unit 110, the possibility of the abnormality affecting the operation of the other control instruction units 110 is reduced.

In addition, in the present embodiment, processing from the control command module 370 to the IF unit 380 on the real-time OS 300 is standardized by using a common signal format; and in the communication module 390, protocol conversion from the common communication format to a signal format of a communication interface standard for each of the control target devices 20 is performed. This has made it possible that most of processing performed by the motion control device 10 can be standardized and control for a plurality of coexistent control target devices 20 of different communication interface standards is easily realized.

Modified Example

The embodiments described above are provided for easy understanding of the present invention and is not for construing the present invention as being limited to it. The flowchart and sequence described in the embodiments, each component included in the embodiments, and its arrangement, material, condition, shape, size, and the like are not limited to those illustrated and can be appropriately changed. In addition, components which are shown in different embodiments can be partially replaced with each other or combined.

For example, an API channel is generated for each device and therefore, when a device is specified, an API channel can be uniquely specified. Therefore, in the present embodiment, the "API channel identifier" may be replaced with the "device identifier."

The invention claimed is:

1. A computer-readable non-transitory storage medium storing a motion control program that is executed by a computer for performing motion control of a control target device, the computer having a non-real-time operating system (OS) and a real-time OS installed thereon, wherein the motion control program causes the computer to perform operations, the operations comprising:

creating, by a channel management unit operating on the real-time OS, an operation channel on a shared memory referable from the non-real-time OS and the real-time OS, wherein the shared memory is shared between a plurality of reception units operating on the non-real-time OS and the channel management unit operating on the real-time OS, wherein the operational channel is common to the plurality of reception units;

providing, by a reception unit of the plurality of reception units, via the operation channel, when receiving a preparation instruction to perform preparation for starting motion control of the control target device from a user-created program associated with the reception unit, an instruction to generate a control command channel to the channel management unit;

creating, by the channel management unit, on the shared memory, when receiving the instruction from the reception unit, the control command channel associated with the user-created program that has provided the preparation instruction;

receiving, by the reception unit, from the user-created program a control command indicating an operation that should be performed by the control target device over a plurality of motion control cycles;

storing, in the control command channel, control command information indicating a content of the received control command; and transmitting, by a fixed-cycle processing unit operating on the real-time OS, to the control target device for each of the plurality of motion control cycles an interpolation command indicating an operation that should be executed for each of the plurality of motion control cycles, based on the control command information obtained from the control command channel, thereby performing motion control of the control target device.

2. The medium according to claim 1, wherein the operations further comprises:

notifying, by the reception unit, via the operation channel, the channel management unit of an instruction to generate a state channel for storing feedback information indicating a state of the control target device; and generating, by the channel management unit, the state channel on the shared memory when receiving the instruction to generate the state channel via the operation channel and when the state channel is not generated on the shared memory.

3. The medium according to claim 2, wherein the operations further comprises:

obtaining, by the reception unit, when receiving from the user-created program an instruction to obtain the feedback information, the feedback information from the state channel and passing the feedback information to the user-created program.

4. The medium according to claim 1, wherein the operations further comprises:

obtaining, by the reception unit, a use authority of the operation channel and when having obtained the use authority, notifying via the operation channel, the channel management unit of an instruction to generate the control command channel; and releasing, by the reception unit, the use authority of the operation channel when receiving from the channel management unit a notification that generation of the control command channel is complete.

5. The medium according to claim 1, wherein the operations further comprises:

obtaining periodically, by the channel management unit, presence or absence of an existence report showing that each of the user-created programs exists; and when the existence report cannot be obtained for a predetermined period of time, deleting from the shared memory the control command channel associated with the user-created program for which the existence report cannot be obtained.

6. A motion control method that is executed by a motion control device for performing motion control of a control target device, the motion control device having a non-real-time operating system (OS) and a real-time OS installed thereon, the method comprising:

creating an operation channel on a shared memory referable from the non-real-time OS and the real-time OS, wherein the shared memory is shared between a plurality of reception units operating on the non-real-time OS and a channel management unit operating on the real-time OS, wherein the operational channel is common to the plurality of reception units;

providing, by a reception unit of the plurality of reception units, when receiving a preparation instruction to perform preparation for starting motion control of the control target device from a user-created program associated with the reception unit, via the operation channel, an instruction to generate a control command channel to the channel management unit;

creating, by the channel management unit, when receiving the instruction from the reception unit, on the shared memory, the control command channel associated with the user-created program that has provided the preparation instruction;

receiving, by the reception unit, from the user-created program, a control command indicating an operation that should be performed by the control target device over a plurality of motion control cycles;

storing, in the control command channel, control command information indicating a content of the received control command; and transmitting, by a fixed-cycle processing unit operating on the real-time OS, to the control target device for each of the plurality of motion control cycles an interpolation command indicating an operation that should be executed for each of the plurality of motion control cycles, based on the control command information obtained from the control command channel, thereby performing motion control of the control target device.

7. A motion control device for performing motion control of a control target device, the motion control device having a non-real-time OS and a real-time OS installed thereon, comprising:

a plurality of reception units operating on the non-real-time OS, each of the plurality of reception units being associated with each of a plurality of user-created programs that operates on the non-real-time OS and controls the control target device;

a channel management unit operating on the real-time OS; and
a fixed-cycle processing unit operating on the real-time OS;
wherein,
  the channel management unit creates an operation channel on a shared memory referable from the non-real-time OS and the real-time OS, wherein the shared memory is shared between the plurality of reception units operating on the non-real-time OS and the channel management unit operating on the real-time OS, wherein the operational channel is common to the plurality of reception units;
  a reception unit of the plurality of reception units provides via the operation channel, when receiving a preparation instruction to perform preparation for starting motion control of the control target device from the user-created program associated with the reception unit, an instruction to generate a control command channel to the channel management unit;
  the channel management unit creates on the shared memory, when receiving the instruction from the reception unit, the control command channel associated with the user-created program that has provided the preparation instruction;
  the reception unit receives from the user-created program a control command indicating an operation that should be performed by the control target device over a plurality of motion control cycles and stores control command information indicating a content of the received control command, in the control command channel; and
  the fixed-cycle processing unit transmits to the control target device for each of the plurality of motion control cycles an interpolation command indicating an operation that should be executed for each of the plurality of motion control cycles, based on the control command information obtained from the control command channel, thereby performing motion control of the control target device.

* * * * *